(12) United States Patent
Thomas et al.

(10) Patent No.: US 9,986,013 B2
(45) Date of Patent: May 29, 2018

(54) SYSTEMS AND METHODS FOR SPACE MANAGEMENT IN FILE SYSTEMS

(71) Applicant: BlackBerry Limited, Waterloo (CA)

(72) Inventors: Edward Eric Thomas, Seattle, WA (US); Bailey Hu, Ottawa (CA); Grant McSheffrey, Ottawa (CA); Jordan Barnes, Stittsville (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days. days.

(21) Appl. No.: 14/246,927

(22) Filed: Apr. 7, 2014

(65) Prior Publication Data

US 2014/0222972 A1 Aug. 7, 2014

Related U.S. Application Data

(63) Continuation of application No. 12/177,137, filed on Jul. 21, 2008, now Pat. No. 8,706,690.

(60) Provisional application No. 61/127,796, filed on May 14, 2008, provisional application No. 61/127,813, filed on May 14, 2008, provisional application No. 61/052,640, filed on May 12, 2008, provisional application No. 61/052,633, filed on May 12, 2008.

(51) Int. Cl.
*G06F 17/30* (2006.01)
*H04L 29/08* (2006.01)

(52) U.S. Cl.
CPC ........ *H04L 67/02* (2013.01); *G06F 17/30138* (2013.01)

(58) Field of Classification Search
CPC .................................................. G06F 17/30138
USPC .......................................... 707/620; 709/219
See application file for complete search history.

(56) References Cited

U.S. PATENT DOCUMENTS 5,713,013 A 1/1998 Black
6,072,479 A 6/2000 Ogawa
(Continued)

FOREIGN PATENT DOCUMENTS

EP 1227396 7/2002
EP 1632945 3/2006
(Continued)

OTHER PUBLICATIONS

Ananth Devulapalli et al., "File Creation Strategies in a Distributed Metadata File System," 2007 IEEE (10 pp.).
(Continued)

*Primary Examiner* — Joshua Bullock
(74) *Attorney, Agent, or Firm* — Fish & Richardson P.C.

(57) ABSTRACT

Apparatus and methods for space management in file systems provide a mechanism to enhance user interaction with multimedia devices. In some aspects, updated metadata of media content stored in a server is retrieved. A representation of the media content stored in the storage device and the media content stored in the server is outputted to the display. Selection of an action associated with the media content stored in the server when the mobile device is not connected to the server is enabled. The action, once selected, remains pending until the mobile device is connected to the server. Execution of the pending action when the mobile device is connected to the server is enabled. The pending action includes one of deleting a media file from the server or downloading a media file from the server.

23 Claims, 13 Drawing Sheets

(56) References Cited

U.S. PATENT DOCUMENTS

| | | |
|---|---|---|
| 6,295,541 B1 | 9/2001 | Bodnar et al. |
| 6,345,256 B1 | 2/2002 | Milsted et al. |
| 6,366,296 B1 | 4/2002 | Boreczky et al. |
| 6,549,922 B1 | 4/2003 | Srivastava et al. |
| 6,744,815 B1 | 6/2004 | Sackstein et al. |
| 7,065,521 B2 | 6/2006 | Li et al. |
| 7,260,312 B2 | 8/2007 | Srinivasan et al. |
| 7,346,687 B2 | 3/2008 | Lipscomb et al. |
| 7,680,849 B2 | 3/2010 | Heller et al. |
| 8,005,789 B2 | 8/2011 | Yoon et al. |
| 2002/0099737 A1 | 7/2002 | Porter et al. |
| 2002/0103919 A1 | 8/2002 | Hannaway |
| 2002/0124099 A1 | 9/2002 | Srinivasan et al. |
| 2002/0147850 A1 | 10/2002 | Richards et al. |
| 2002/0148343 A1 | 10/2002 | Gross |
| 2003/0167318 A1 | 9/2003 | Robbin et al. |
| 2003/0236695 A1 | 12/2003 | Litwin, Jr. |
| 2004/0126038 A1 | 1/2004 | Aublant et al. |
| 2004/0034650 A1 | 2/2004 | Springer, Jr. et al. |
| 2004/0103174 A1 | 5/2004 | Balducci et al. |
| 2004/0205638 A1 | 10/2004 | Thomas et al. |
| 2004/0267825 A1 | 12/2004 | Novak et al. |
| 2005/0010616 A1 | 1/2005 | Burks |
| 2005/0015389 A1 | 1/2005 | Novak et al. |
| 2005/0015551 A1 | 1/2005 | Eames et al. |
| 2005/0021470 A1 | 1/2005 | Martin et al. |
| 2005/0098023 A1 | 5/2005 | Toivonen et al. |
| 2005/0131959 A1 | 6/2005 | Thorman et al. |
| 2005/0165752 A1 | 7/2005 | Mathew et al. |
| 2005/0210119 A1 | 9/2005 | Kumar |
| 2005/0216855 A1 | 9/2005 | Kopra et al. |
| 2006/0004699 A1 | 1/2006 | Lehikoinen et al. |
| 2006/0020589 A1 | 1/2006 | Wu et al. |
| 2006/0062095 A1 | 3/2006 | Volk et al. |
| 2006/0069998 A1 | 3/2006 | Artman et al. |
| 2006/0083207 A1 | 4/2006 | Karimi |
| 2006/0100978 A1* | 5/2006 | Heller et al. ............ 707/1 |
| 2006/0163358 A1 | 7/2006 | Biderman |
| 2006/0188215 A1 | 8/2006 | Matsutani |
| 2006/0204211 A1 | 9/2006 | Morohoshi et al. |
| 2006/0242259 A1 | 10/2006 | Vallabh et al. |
| 2007/0005653 A1 | 1/2007 | Marsh |
| 2007/0038941 A1* | 2/2007 | Wysocki et al. ............ 715/748 |
| 2007/0043765 A1* | 2/2007 | Chan et al. ............ 707/104.1 |
| 2007/0050366 A1 | 3/2007 | Bugir et al. |
| 2007/0061409 A1 | 3/2007 | Rydenhag |
| 2007/0067597 A1 | 3/2007 | Chen et al. |
| 2007/0083651 A1 | 4/2007 | Ishida |
| 2007/0112844 A1 | 5/2007 | Tribble et al. |
| 2007/0112861 A1 | 5/2007 | Buczek et al. |
| 2007/0180127 A1 | 8/2007 | Vuori |
| 2007/0198602 A1 | 8/2007 | Ngo et al. |
| 2007/0233702 A1 | 10/2007 | Ohkita et al. |
| 2007/0271310 A1 | 11/2007 | Han et al. |
| 2008/0052380 A1 | 2/2008 | Morita et al. |
| 2008/0086494 A1 | 4/2008 | Heller et al. |
| 2008/0109449 A1 | 5/2008 | Chun et al. |
| 2008/0194276 A1* | 8/2008 | Lin et al. ............ 455/466 |
| 2009/0150569 A1 | 6/2009 | Kumar et al. |
| 2009/0282020 A1 | 11/2009 | McSheffrey et al. |
| 2009/0282050 A1 | 11/2009 | Thomas et al. |
| 2009/0282057 A1 | 11/2009 | Thomas |
| 2009/0282077 A1 | 11/2009 | Thomas |
| 2009/0282078 A1 | 11/2009 | Thomas et al. |
| 2009/0282088 A1 | 11/2009 | Thomas et al. |

FOREIGN PATENT DOCUMENTS

| | | |
|---|---|---|
| EP | 1708101 | 10/2006 |
| EP | 1923797 | 5/2008 |
| EP | 1903450 A3 | 12/2008 |
| JP | H0962556 | 3/1997 |
| JP | H1115756 | 1/1999 |
| JP | 2000324324 | 11/2000 |
| JP | 2001186459 | 7/2001 |
| JP | 2002041823 | 2/2002 |
| JP | 2002182658 | 6/2002 |
| JP | 2002230316 | 8/2002 |
| JP | 2003186785 | 7/2003 |
| JP | 2005044097 | 2/2005 |
| JP | 2006065813 | 3/2006 |
| JP | 2006080965 | 3/2006 |
| JP | 2006252478 | 9/2006 |
| JP | 2007110199 | 4/2007 |
| JP | 2007156804 | 6/2007 |
| JP | 2007300511 | 11/2007 |
| JP | 2008052520 | 3/2008 |
| JP | 2008052820 | 3/2008 |
| JP | 2008538843 | 11/2008 |
| WO | 2000/063801 | 10/2000 |
| WO | 2002/075539 | 9/2002 |
| WO | 2003/036541 | 5/2003 |
| WO | 2005096176 | 10/2005 |
| WO | 2005/116868 | 12/2005 |
| WO | 2006047578 | 5/2006 |
| WO | 2006093839 | 9/2006 |
| WO | 2006116368 A2 | 11/2006 |
| WO | 2007145854 | 12/2007 |
| WO | 08008448 | 1/2008 |

OTHER PUBLICATIONS

Patent Examination Report No. 2 dated Feb. 11, 2014, by the Australian Patent Office in counterpart Application No. 2012200321 (4 pp.).

Office Action dated Jan. 28, 2014, by te Chinese Patent Office in counterpart Application No. 200910163961.3 (4pp.).

European Application No. 09160028.8, Search Report dated Jul. 27, 2009 (7 pp.).

European Application No. 09160035.3, Search Report dated Oct. 12, 2009 (9 pp.).

Satyanarayanan et al., "A Highly Available File System for a Distributed Workstation Environment," IEEE 1990 (pp. 447-459).

U.S. Appl. No. 12/177,101: Non-Final Office Action dated Nov. 10, 2010 (13 pp.)

U.S. Appl. No. 12/177,101: Final Office Action dated Apr. 26, 2011 (10 pp.).

U.S. Appl. No. 12/177,101: Response dated Feb. 10, 2011 (13 pp.).

U.S. Appl. No. 12/177,105: Non-Final Office Action dated Oct. 28, 2010 (10 pp.).

U.S. Appl. No. 12/177,105: Final Office Action dated Apr. 12, 2011 (9 pp.).

U.S. Appl. No. 12/177,105: Response dated Jan. 28, 2011 (11 pp.).

U.S. Appl. No. 12/177,112: Non-Final Office Action dated Oct. 29, 2010 (18 pp.).

U.S. Appl. No. 12/177,112: Response dated Mar. 28, 2011 (10 pp.).

U.S. Appl. No. 12/177,116: Non-Final Office Action dated Nov. 15, 2010 (17 pp.).

U.S. Appl. No. 12/177,116: Response dated Feb. 11, 2011 (9 pp.).

U.S. Appl. No. 12/177,118: Final Office Action dated Apr. 26, 2011 (10 pp.).

U.S. Appl. No. 12/177,118: Non-Final Office Action dated Nov. 15, 2010 (12 pp.).

U.S. Appl. No. 12/177,118: Response dated Feb. 15, 2011 (14 pp.).

Australian Application No. 2009201879, Subsequent Examiner Report dated Apr. 15, 2011 (3 pp.).

Australian Application No. 2009201279, Examiner Report dated Mar. 8, 2011 (3 pp.).

Australian Application No. 2009201279, Response dated Feb. 17, 2011 (2 pp.).

Australian Application No. 2009201876, Response dated Feb. 17, 2011 (3 pp.).

Australian Application No. 2009201879, First Examiner Report dated Apr. 19, 2010 (4 pp.).

Australian Application No. 2009201879, Response dated Mar. 17, 2011 (3 pp.).

Australian Application No. 2009201876, Subsequent Examiner Report dated Mar. 2, 2011 (4 pp.).

(56) References Cited

OTHER PUBLICATIONS

Canadian Application No. 2660222, Office Action dated Feb. 8, 2011 (2 pp.).
Canadian Application No. 2660224, Office Action dated Feb. 3, 2011 (3 pp.).
Canadian Application No. 2661066, Office Action dated Feb. 3, 2011 (3 pp.).
European Application No. 09155844.5, Extended European Search Report dated Aug. 27, 2009 (3 pp.).
European Application No. 09160031.2, Response dated Nov. 20, 2009 (7 pp.).
Japanese Application No. 2009-115058, Office Action dated Jan. 31, 2011 (2 pp.).
Japanese Application No. 2009-91198, Office Action dated Mar. 9, 2011 (9 pp.).
European Application No. 09160031.2, Extended European Search Report dated Jul. 17, 2009 (7 pp.).
Peery, C. et al., "Wayfinder: Navigating and Sharing Information in a Decentralized World," Lecture Notes in Computer Science, Databases, Information Systems, and Peer-to-Peer Computing, vol. 3367/2005 (2005), pp. 200-214.
Sinitsyn et al., "A Synchronization Framework for Personal Mobile Server," Proceeding of the Second IEEE Annual Conference on Pervasive Computing and Communications Workshops (PERCOMW'04) (Mar. 14, 2004), pp. 208-212.
Vetro, A. et al., "Media Conversions to Support Mobile Users," Electrical and Computer Engineering 2001, Canadian Conference on May 13-16, 2001 (May 13, 2001) pp. 607-612.
U.S. Appl. No. 12/177,112, Final Office Action dated Jun. 13, 2011 (19 pp.).
Japanese Application No. 2009-89536, Office Action dated May 12, 2011 (7 pp.).
Taku, F. et al., "Content Protection in Content Delivery for Adaptive Content," The IEICE Transactions on Communications (Japanese Edition), No. 3, vol. J89-B, Mar. 2006 (pp. 324-336).
Mohan et al., "Adapting Multimedia Internet ocntent for Universal Access," IEEE Transactions on Multimedia, Mar. 1999, 1(1):104-114.
Rocha et al., "Middleware for multi-client and multi-server mobile applications," Second International Symposium on Wireless Pervasive Computing, Feb. 5-7, 2007.
Wang and Karmouch, "A Multimedia File Structure for Continuous and discrete Media," Electrical and Computer Engineering, Sep. 14-17, 1993, 2:644-647.
European Search Report in European Application No. 09155853.6, dated May 29, 2009, 5 pages.
Extended European Search Report in European Application No. 09155841.1, dated May 11, 2009, 6 pages.
Extended European Search Report in European Application No. 09155844.5, dated May 19, 2009, 5 pages.
Office Action issued in Indian Application No. 717/DEL/2009 dated Sep. 28, 2016.
Communication Pursuant to Article 94(3) EPC issued in European Application No. 09155853.6 dated Nov. 30, 2016.
Communication Pursuant to Article 94(3) EPC issued in European Application No. 09155844.5 dated Nov. 30, 2016.
Communication Pursuant to Article 94(3) EPC issued in European Application No. 09160031.2 dated Jan. 30, 2017.
Communication Pursuant to Article 94(3) EPC issued in European Application No. 09160035.3 dated Feb. 22, 2017.
"A Primer to SyncML/OMA DS," (OMA-WP-SyncML_Primer-20070718-D), Draft, Open Mobile Affiance (OMA), San Diego, California, Jul. 18, 2007, pp. 1-27.
Notice of Hearing issued in Indian Application No. 638/DEL/2009 dated Jan. 5, 2017.
Summons to Attend Oral Proceedings issued in European Application No. 09155844.5 dated May 29, 2017; 8 pages.
Summons to Attend Oral Proceedings issued in European Application No. 09155853.6 dated Jun. 9, 2017; 8 pages.
Summons to Attend Oral Proceedings issued in European Application No. 09155841.1 dated Jul. 11, 2017; 11 pages.
Brief Communication issued in European Application No. 09155853.6 dated Nov. 6, 2017; 11 pages.
Summons to Attend Oral Proceedings Pursuant to Rule 115(1) Epc issued in European Application No. 09160031.2 dated Nov. 13, 2017; 9 pages.
Office Action issued in U.S. Appl. No. 12/177,116 dated Dec. 1, 2017; 35 pages.
Decision to Refuse Application issued in European Application No. 09155844.5 on Nov. 20, 2017; 12 pages.
Decision to Refuse Application issued in European Application No. 09155853.6 on Nov. 30, 2017; 12 pages.
Summons to Attend Oral Proceedings issued in European Application No. 09160035.3 on Dec. 7, 2017; 10 pages.
Decision to Refuse Application issued in European Application No. 09155841.1 on Jan. 10, 2018.
Communication Pursuant to Article 94(3) EPC issued in European Application No. 12163039.6 on Mar. 6, 2018, 7 pages.

* cited by examiner

SYSTEMS AND METHODS FOR SPACE MANAGEMENT IN FILE SYSTEMS

RELATED APPLICATIONS

This is a continuation of application Ser. No. 12/177,137, filed Jul. 21, 2008, which claims the benefit of U.S. provisional application No. 61/127,796, filed May 14, 2008, U.S. provisional application No. 61/127,813, filed May 14, 2008, U.S. provisional application No. 61/052,640, filed May 12, 2008, and U.S. provisional application No. 61/052,633, filed May 12, 2008, all of which are incorporated herein by reference.

BACKGROUND

Access to information is an important factor in the functioning of modern society. Improvements to the flow of information enhance one's ability to interact with others, to respond to changing needs, and to avail oneself of enjoyment from processing various media based information.

BRIEF DESCRIPTION OF THE DRAWINGS

Various example embodiments are further described with reference to the following accompanying drawings.

DETAILED DESCRIPTION

Certain specific details are set forth in the following description and figures to provide a thorough understanding of various embodiments. Those of ordinary skill in the relevant art will understand that they can practice other embodiments without one or more of the details described below. In addition, the various methods are described by reference to a sequence of operations in the following disclosure; however, the description as such is for providing a clear implementation of embodiments of the disclosure, and the particular sequence described should not be taken as required.

In general, it is contemplated that the various systems, methods, and computer readable media disclosed herein will be implemented within a system for transferring media content. Such a system may generally be described as a computer-implemented or a computerized system that includes "subsystems" for synchronizing media files available from multiple sources in the manner described below.

Figure 1:
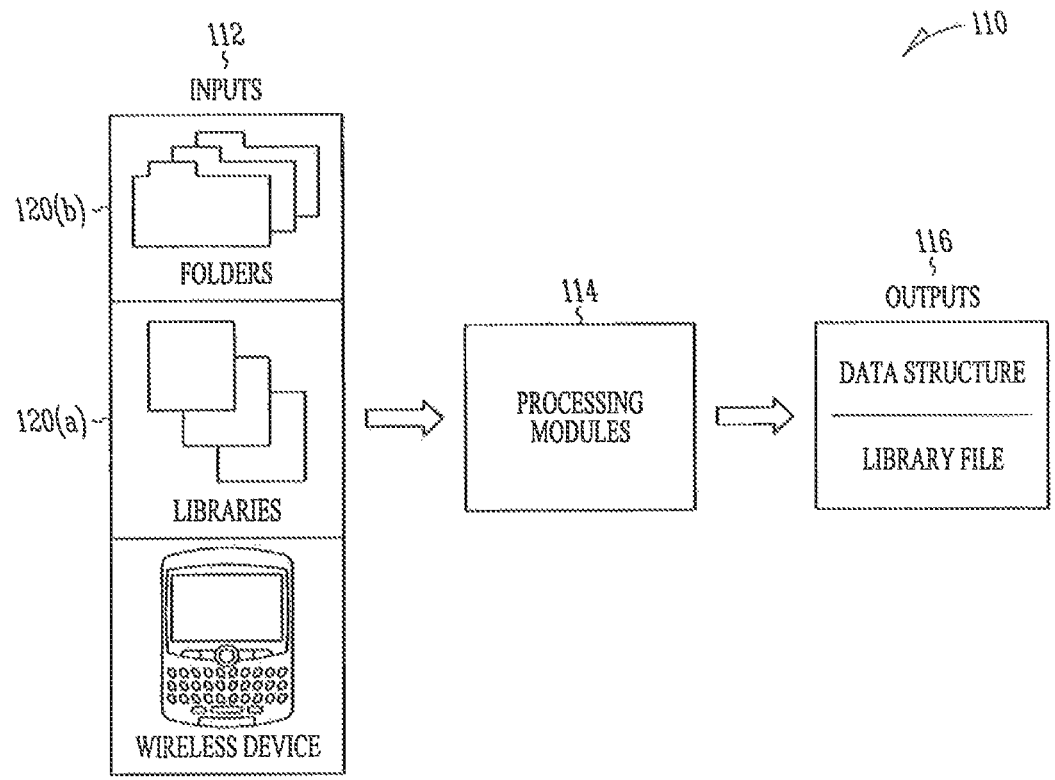
FIG. 1 is a functional block diagram of system for managing media content.

Operating Environment. FIG. 1 is a functional block diagram of a system for managing media content. The system for managing media content 110 comprises inputs 112, processing modules 114, and outputs 116.

The inputs 112 comprise one or more sources of media content 120 (also referred to herein as "source" or "sources"). Media content may include content in any media format. Some examples of content may include, but are not limited to, audio files, video files, image files, multimedia files, and the like. Audio file formats may include, but are not limited to, MP3, AIFF, WAV, MPEG-4, AAC, and Apple Lossless. Other example file formats for media content include, but are not limited to, files having extensions doc, dot, wpd, txt, xis, pdf, ppt, jpg, jpeg, png, bmp, gif, html, htm, zip, tif, tiff, wmf, and the like.

In one embodiment, the one or more sources of media 120 content may be libraries 120(*a*) such as libraries for media players including, but not limited to, iTunes media players, Windows Media Player (WMP), RealPlayer and the like. Each library 120(*a*) may have N collections. A collection is a subset of the files in the library. The collections may be comprised of references to the files. Each collection may refer to anywhere from zero files to all of the files in the library. An example of a collection for a music library may be a playlist. In another embodiment, the sources of media content 120 may be files within one more folders 120(*b*) on a single computer system or on multiple computer systems.

The processing modules 114 comprise software and/or hardware subsystems to transfer media content from media sources to devices with media players. In some embodiments, the various subsystems may be implemented with software that is executable by a processor. In other embodiments, the various subsystems may be implemented with computer hardware. In still further embodiments, the various subsystems may be implemented with a combination of computer hardware and software.

The processing modules operate as a "connector" meaning that the processing modules interface between the media sources and different types of devices with media players including, but not limited to, mobile wireless devices. The processing modules may use, but are not limited to, a Windows COM interface when connecting to the media sources. In addition, the processing modules create a representation (e.g., a library or libraries) of the media content available from multiple sources.

In some embodiments, the output 116 of the processing modules is a representation created by the processing modules. In some embodiments, the representation may also be maintained by the processing modules. In other embodiments, the output also comprises device specific data for a mobile wireless device or a media player. In still other embodiments, the output also comprises metadata such as metadata based on user preferences or device settings.

In an example embodiment the representation is any means for identifying the content of the media source files. In some embodiments, the representation is a library file that is created by the processing modules. The library file contains metadata for the media content available in the one or more media sources, but omits the actual media content. The library file may be organized using a standard format that represents the information contained in the media sources. In some embodiments, the standard format is a compressed format and/or a format that is substantially smaller than the media library itself. For example, a media library with 30 GB of audio files may be represented by the media sync engine 104 in a file that may be 200 KB.

Figure 2:
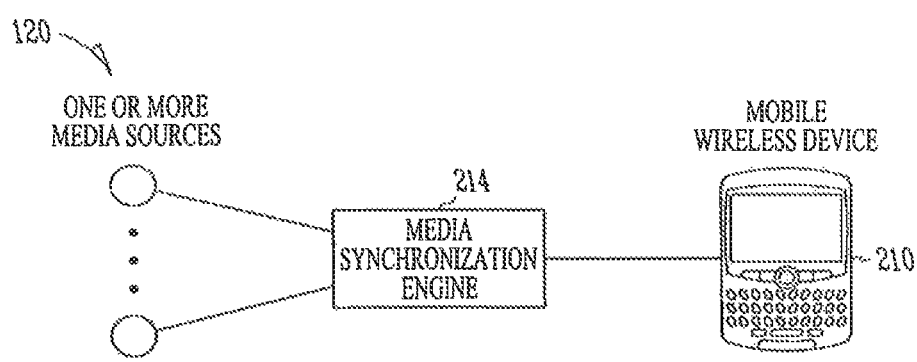
FIG. 2 is a block diagram of a system for transferring media content to mobile wireless devices according to an example embodiment.

FIG. 2 is a block diagram of a system for transferring media content to mobile wireless devices according to an example embodiment. The system for transferring media content 200 comprises one or more media sources 120, a media synchronization engine 214 (also referred to as a media sync engine or a media sync application), and a mobile wireless device 210.

The media synchronization engine 214 creates a representation of media content available from the one or more media sources 120 and provides selected media content from the one or more media sources 120 to the mobile wireless device 210. In one embodiment, the media synchronization engine 214 is an example of the processing modules shown in FIG. 1.

In one embodiment, the media synchronization engine 214 provides a method to synchronize a media library such as an iTunes digital music library with a smartphone such as a BlackBerry brand smart phone. The media content may be transferred from the iTunes digital music library to the Blackberry brand smart phone using a wireless connection or a wired connection such as a High Speed USB 2.0 connection.

The mobile wireless device 210 may include, but is not limited to, mobile telephones, portable computers, personal digital assistants (PDAs), media players and other devices that may be conveniently carried by a user and provide wireless communication. Mobile telephones include wireless communication devices that have generally been referred to as cell phones. Mobile telephones may include a wide range of communication devices from portable phones with limited functionality beyond voice communication to portable phones capable of providing the functionality of a personal computer.

The mobile wireless device 210 may comprise more than one storage device. In one embodiment, one of the storage devices may be accessed by the media synchronization engine 214 as well as by other applications either on the same computer system as the media synchronization engine or on a different computer system external sources (collectively referred to herein as "external sources"). The external sources may include applications other than the media synchronization engine 214 or a second instance of the media synchronization engine 214 running on a different computer system. In an example embodiment, the mobile wireless device 210 comprises an internal storage device and a removable storage device such as a Secure Digital Memory Card ("SD Card"). The file system on the SD card comprises files transferred and managed by the media synchronization engine 214 as well as files from applications other than the media synchronization engine 214.

In operation, the system for transferring media content shown in FIG. 2 creates a unified representation of the media content available in one or more media sources and provides a means for accessing the media content. Using the system for transferring media content shown in FIG. 2, individual media content items may be transferred from the media source to any device with a media player. The collection of media content items stored on a device may be changed by modifying the selection of media content to transfer to the device and resynchronizing the device with the media synchronization engine.

Figure 3:
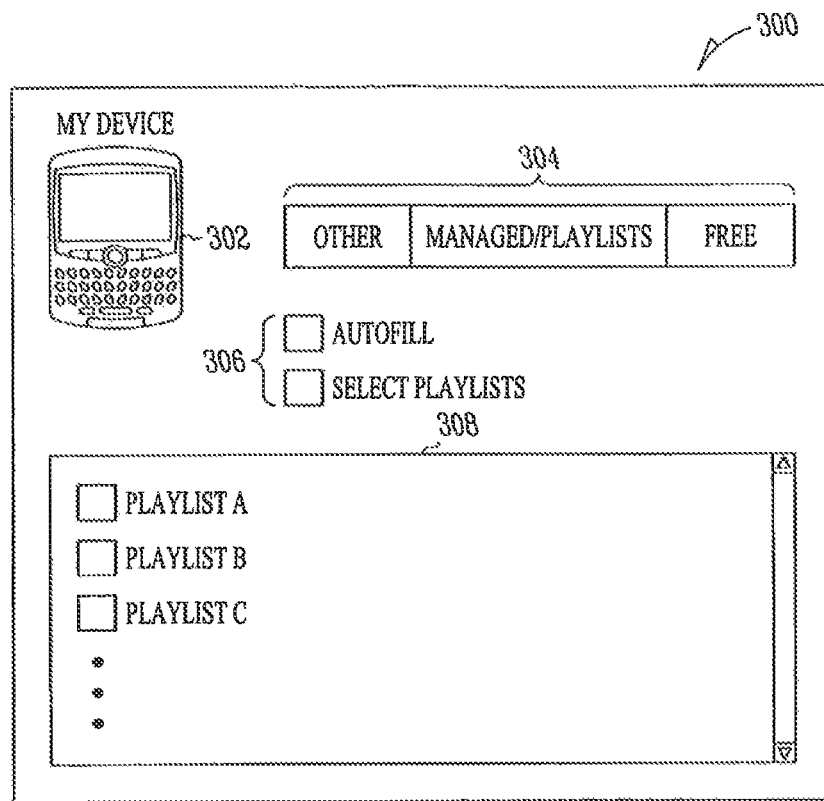
FIG. 3 is a block diagram of a user interface for a media synchronization engine according to an example embodiment.

FIG. 3 is a block diagram of a user interface for a media synchronization engine according to an example embodiment. The user interface 300 may be used with a media synchronization engine such as media synchronization engine 214 shown in FIG. 2. As shown in FIG. 3, the user interface 300 comprises a destination file system identifier 302, a space management indicator 304, user selection controls 306 and a playlist window 308.

The destination file system identifier 302 may be any text or visual identifier of the destination file system. For example, if the destination file system is a mobile wireless device, such as mobile wireless device 210 in FIG. 2, the destination file system identifier 302 may be an icon representing the mobile wireless device. In some embodiments, the mobile wireless device may be assigned a common name such as "Joe's Phone" and the common name may also be displayed as part of the destination file system identifier 302. In this example, if "Joe's Phone" has more than one storage device such as an internal storage device and an external storage device (e.g., a SD Card), the user interface 300 may comprise a menu for the user to select a destination file systems from the storage devices.

The space management indicator 304 may provide a visual representation of the total amount of file system space expected to be utilized by a future synchronization with the media synch engine. The space management indicator 304 may be any visual representation that allows a user to understand what will happen when the selected playlists are synchronized to the destination file system (e.g., the wireless mobile device) even though the playlists have not actually been written to the destination file system yet. As a user selects playlists to synchronize with the mobile wireless device, the media synchronization engine predicts the storage space requirements for the selected playlists in the destination file system and displays this information to the user through the space management indicator 304. In another embodiment, the space management indicator 304 dynamically updates the representation as the user selects additional playlists.

In some embodiments, the space management indicator 304 may comprise other information about the storage space of the destination file system in addition to the storage space requirements for the selected playlists. For example, the space management indicator 304 may also display the storage space requirements for data from external sources in the destination file system. This allows the user to see what portion of the destination file system is unavailable for use by the media synchronization engine. In another example, the space management indicator 304 may display the amount of available storage space in the destination file system. This allows the user to see whether they may select additional playlists to include in the next synchronization or if their selections have already exceeded the available space in the destination file system. In some embodiments, when a user's selections exceed the available space, the user may be given the option to reduce a reserved space setting thereby increasing the available space and as a result allowing the user's selections to all be included in the next synchronization. In still other embodiments, an amount of reserved space in the destination file system is omitted from the calculation of the available space and likewise is not represented in the available space shown in the space management indicator 304.

The user selection controls 306 provide options that the user may select. For example, the user may select "Autofill" if the user wishes to allow the media synchronization engine to determine all or a portion of the media files to transfer to the mobile wireless device. If the user wishes to select individual media content, such as individual playlists, to transfer to the device, the user may also indicate that by selecting the "Select Playlists" control in the user selection controls 306. Embodiments of the disclosure are not limited to the example controls shown FIG. 3. Additional controls, preferences, or setting choices may be presented to the user through the user interface 300. For example, in an alternate embodiment, the "Select Playlists" control is replaced by a Hide/Show icon for displaying or hiding the playlist window 308.

The playlist window 308 displays individual playlists available from multiple media sources. In some embodiments, the playlist window 308 may be hidden until the "Select Playlists" control is selected. In other embodiments, the playlist window 308 may be expanded to display the individual items in a playlist. In some embodiments, the playlists from multiple sources of media content are displayed together; and in other embodiments, the playlists from multiple sources are organized and displayed according to the source.

Example embodiments of systems for transferring media content have been described by reference to FIGS. 1-3.

Methods. In this section, particular methods of example embodiments are described by reference to a series of flow charts. In one embodiment, the methods to be performed constitute computer programs made up of computer-executable instructions.

Figure 4:
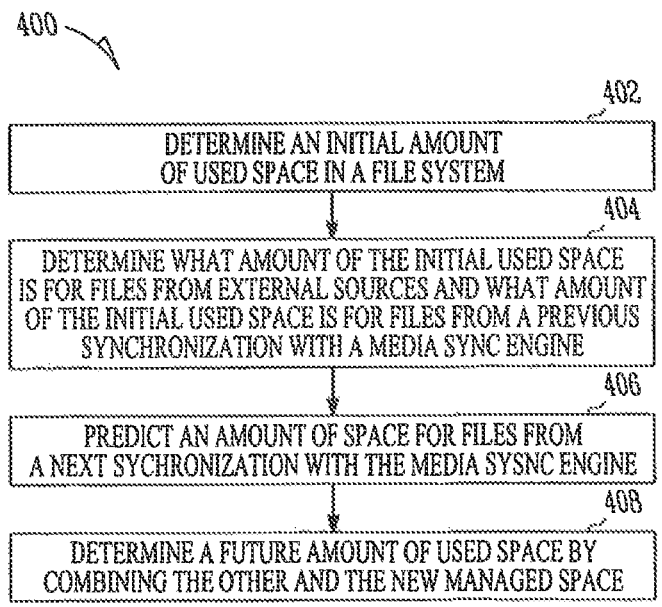
FIG. 4 is a flow chart of a method of predicting future storage space usage in a file system having synchronized media content according to an example embodiment.

FIG. 4 is a flow chart of a method of predicting future storage space usage in a file system having synchronized media content according to an example embodiment. In some embodiments, the method shown in FIG. 4 is be performed by a media synchronization engine such as the media synchronization engine shown in FIG. 2.

As shown in FIG. 4, a media synchronization engine determines an initial amount of used space ("Used") in a file system (block 402). In one embodiment, the Used space may be determined by querying the files system for the total capacity of the file system and also for the freespace of the file system. The used space may be determined by subtracting the freespace from the total capacity. What remains is referred to here at the initial amount of used space ("Used").

Figure 5:
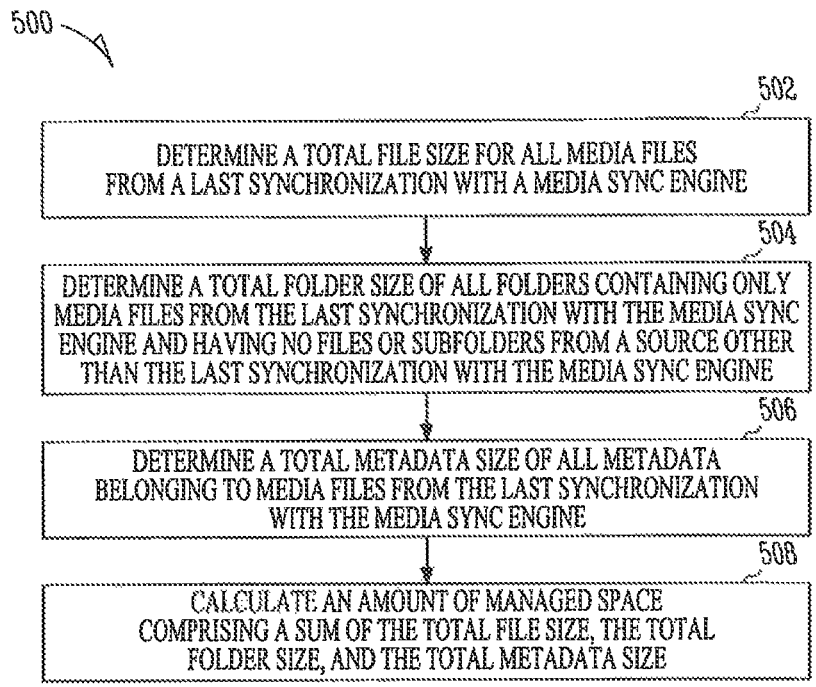
FIG. 5 is a flow chart of a method for determining Managed space according to an example embodiment.

Because the media synchronization engine may be sharing the file system with other applications or even with other instances of the media synchronization engine, the media synchronization engine determines what amount of the initial used space is for files from external sources. Data from external sources is also referred to herein as "Other". In order to determine the "Other" space, the media synchronization engine determines what amount of the initial used space is for files from the last synchronization with the same particular instance of the media sync engine. Data from the last synchronization with the same computer are also referred to herein as "Managed" (block 404). The Managed space is used to calculate the Other space as follows: OTHER=(CAPACITY−FREESPACE)−MANAGED. FIG. 5 below is a more detailed flow chart of a method for determining Managed space according to an example embodiment.

Figure 6:
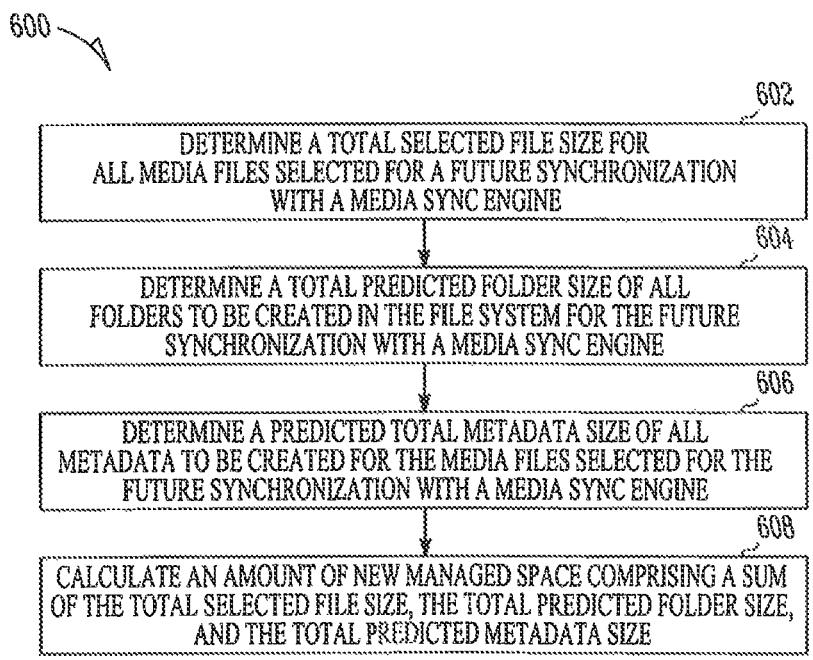
FIG. 6 is a flow chart of a method of determining New Managed space according to an example embodiment.

In order to predict the future storage space usage in a file system, the media synchronization engine predicts an amount of space for files from a next synchronization with the media sync engine. (block 406) The future storage space from the next synchronization is referred to here in as "New Managed". FIG. 6 below is a more detailed flow chart of a method for determining New Managed space according to an example embodiment.

Finally, the media synchronization engine determines a future amount of used space by adding the Other and the New Managed space (block 408). The future amount of used space represents a total amount of file system space expected to be utilized by a future synchronization with the media synch engine. Thus, a user will be able to know prior to synchronization if he/she has selected more playlists than a device may be able to hold.

Embodiments of the disclosure are not limited to the operations shown in FIG. 4. Additional or different operations may be used in different implementations of the disclosure.

FIG. 5 is a flow chart of a method for determining Managed space according to an example embodiment. In some embodiments, the method shown in FIG. 5 is be performed by a media synchronization engine such as the media synchronization engine shown in FIG. 2. As described above, Managed space is calculated for the media synchronization engine performing the synchronization. Managed space refers to storage space used in a file system for the last synchronization with the same computer. In other words, the Managed space is the amount of file system space currently in use for data from a particular media synchronization engine.

As shown in FIG. 5, the method of calculating an amount of file system space managed by a media sync engine involves determining the total size of files, folders, and metadata already synchronized to the files system. The media synchronization engine determines a total file size for all media files from a last synchronization with a media sync engine (block 502). The media synchronization engine also determines a total folder size of all folders containing only media files from the last synchronization with the media sync engine and having no files or subfolders from a source other than the last synchronization with the media sync engine (block 504). And, the media synchronization engine also determines a total metadata size of all metadata belonging to media files from the last synchronization with the media synch engine (block 506). The amount of managed space is the stun of the total file size, the total folder size, and the total metadata size (block 508).

Thus, the amount of managed space represents a total amount of file system space utilized by the last synchronization with the media synch engine ("Managed"). The Managed space comprises a) the size on disk of the file set synchronized from the local computer running the media synchronization engine, b) the size on disk of all folders that would not need to exist if the file set was no longer synchronized from the local computer, and c) the size on disk of files or portions of files (metadata) that are dynamically generated by the application (or device) and would not need to exist if the file set was no longer synchronized from the local computer.

Embodiments of the disclosure are not limited to the operations shown in FIG. 5. Additional or different operations may be used in different implementations of the disclosure. For example, in an alternate embodiment, the size of Managed disk space is calculated as follows. First, all paths for files already synchronized to the destination file system are stored in a transaction file. Then, as media synchronization engine loops through each of these file paths, the size on disk of each file is calculated and added to a total sum. In one embodiment, the size on disk of each file is the size in bytes of the file rounded up to the nearest disk sector size.

Continuing with the alternate embodiment for calculating Managed space, determining which folders are part of the Managed space may be done through a recursive method in which each folder is checked for the following: a) any subfolders that are not part of Managed space, b) files that are listed in the cached transaction file, c) any files that are not listed in the transaction file (other than dynamically generated files (example: BBThumbs.dat), and d) dynamically generated files (example: BBThumbs.dat). In one embodiment, the size on disk of a particular folder is added to the sum of Managed space only when a) all subfolders are found to be part of Managed space, and b) all files other than those dynamically generated (example: BBThumbs.dat) are found to be listed in the transaction file. In addition, the size on disk of any dynamically generated files (BBThumbs.dat) found in a Managed folder is also added to the sum of Managed space.

FIG. 6 is a flow chart of a method for determining New Managed space according to an example embodiment. In some embodiments, a media synchronization engine such as the media synchronization engine shown in FIG. 2 performs the method shown in FIG. 6. As described above, New Managed space is useful when a user has selected data to be synchronized to the destination file system but the data has not yet been written to the disk. The media synchronization engine is capable of predicting the size requirements on disk for this data both to display to the user and to determine the amount of disk space available for an autofill operation. In contrast to the calculation of Managed space described in reference to FIG. 5, when the New Managed space size is calculated the size of the extra folders and metadata to be created on the disk as part of the synchronization are not known. Instead, the media synchronization engine predicts the size of the folders and the metadata to be created as part of the calculation.

As shown in FIG. 6, the media synchronization engine determines a total selected file size for all media files selected for a future synchronization with a media sync engine (block 602). The media synchronization engine also determines a total predicted folder size of all folders to be created in the file system for the future synchronization with the media sync engine (block 604). And, the media synchronization determines a predicted total metadata size of all metadata to be created for the media files selected for the future synchronization with the media synch engine (block 606). Finally, the media synchronization engine calculates the amount of New Managed space by adding the total selected file size, the total predicted folder size, and the total predicted metadata size. The amount of new managed space represents a total amount of file system space expected to be utilized by a future synchronization with the media synch engine ("New Managed") (block 608).

Embodiments of the disclosure are not limited to the operations shown in FIG. 6. Additional or different operations may be used in different implementations of the disclosure. For example, in an alternate embodiment, the size of New Managed disk space is calculated as follows.

As the media synchronization engine loops through the source path of each file to be copied, the size on disk of each file is calculated and added to a sum. In one embodiment, the size on disk of each file is the size in bytes of the file rounded up to the nearest destination file system sector size. If the media synchronization engine will inject album art into the file during synchronization, the size of the file plus the size of what is injected into the file will be rounded up to the next sector size.

Next, continuing with the alternative embodiment, the destination paths are assigned to all files selected to be copied to the destination file system. In one embodiment, the tracks are copied into folders under Artist/Album unless part of a compilation in which case the are stored in Compilations/Album. As the media synchronization engine loops through the destination paths, the number of folders that need to be created in the destination file system are determined. In one embodiment, the number of folders that to be created is the equal to the number of artists not in a compilation album plus the number albums for each artist, plus the compilation folder if required.

In one embodiment, when a file is assigned to a particular folder, the artist and album are stored in the file's metadata. In addition, whether or not a song belongs as part of a "Compilations" folder may be determined dynamically in some embodiments. For example, determining whether a song belongs in the compilations folder comprises first determining that in the selected set of songs, at least two songs exist from particular album. Then, for the songs selected from the particular album, identifying at least two songs that exist with different artists. In other words, at least two of the music tracks to be synchronized have identical album metadata but differing artist metadata and the resulting folder created indicates that the contents are part of a compilation album.

Finally, the size on disk of all folders to be created is added to the sum, plus the size of any dynamically generated files rounded up to the next sector size (such as for metadata). In addition, in some embodiments, a Thumbs.dat file may be created and when it is the size of this file will be also added to the sum.

Figure 7:
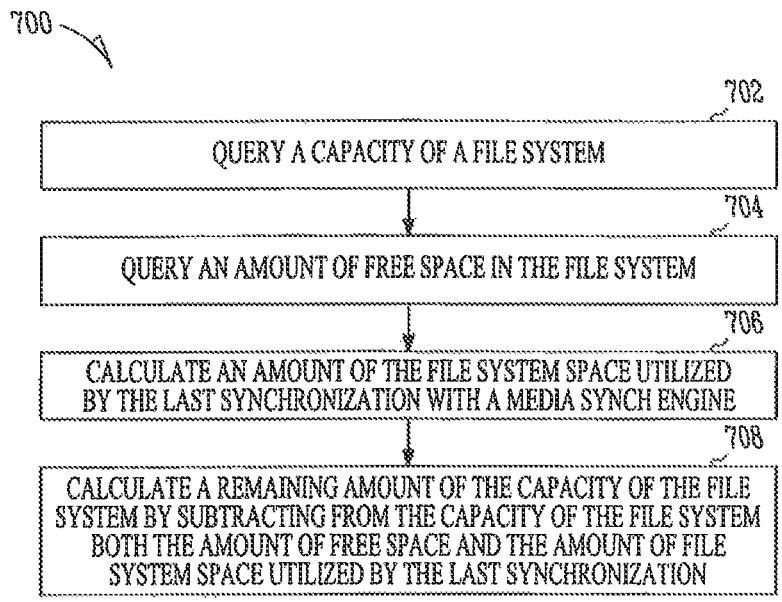
FIG. 7 is a flow chart of a method of calculating an amount of file system space utilized for files from external sources according to an example embodiment.

FIG. 7 is a flow chart of a method of calculating an amount of file system space utilized for files from external sources according to an alternative embodiment. In some embodiments, the method shown in FIG. 7 is performed by a media synchronization engine such as the media synchronization engine shown in FIG. 2.

As shown in FIG. 7, a file system may be queried for a capacity (block 702) and an amount of free space (block 704). The media synchronization engine calculates an amount of file system space utilized by a last synchronization with a media synch engine ("Managed") (block 706). In one embodiment, the Managed spaced is calculated as described by reference to FIG. 5. The media synchronization engine then calculates a remaining amount of the capacity of the file system by subtracting from the capacity of the file system both the amount of free space and the amount of file system space utilized by the last synchronization. The remaining amount represents an amount of the file system space utilized for files from external sources ("Other") (block 708).

Embodiments of the disclosure are not limited to the operations shown in FIG. 7. Additional or different operations may be used in different implementations of the disclosure.

Figure 8:
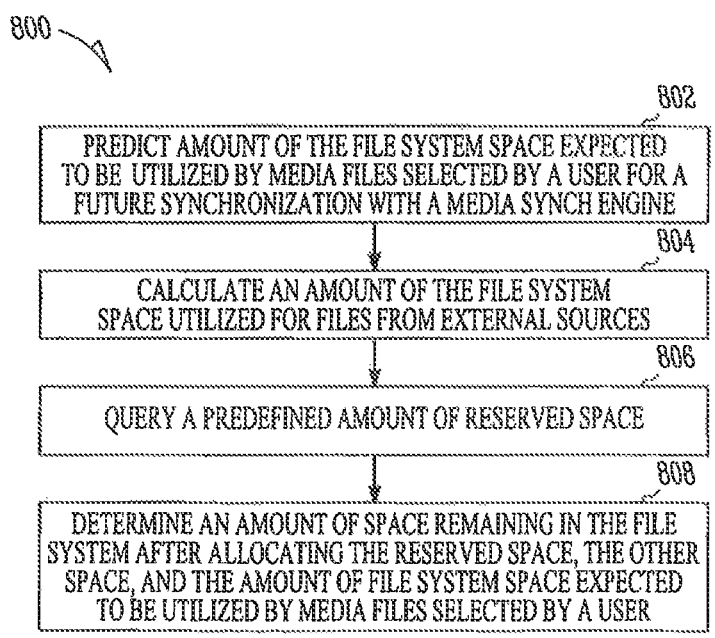
FIG. 8 is a flow chart of a method of transferring media content according to an example embodiment.

FIG. 8 is a flow chart of a method of determining an amount of file system space according to an alternative embodiment. The method may be performed by a media synchronization engine such as the media synchronization engine shown in FIG. 2.

As shown in FIG. 8, a media synchronization engine predicts an amount of file system space expected to be utilized by media files selected by a user for a future synchronization (block 802). The media synchronization engine then calculates an amount of file system space utilized for files from external sources ("Other") (block 804). The media synchronization engine determines an amount of space remaining in the file system. The amount of space remaining includes all of the space that is not used for files from external sources and that is not expected to be used for media files selected by the user.

In one embodiment, the entire amount of space remaining represents an amount of space available for the media sync engine to automatically fill ("autofill") with media files ("Predicted Autofill"). In an a alternative embodiment, the media synchronization also queries a predefined amount of reserved space ("Reserved Space"). The Reserved Space may be set as a system default, or may be set by the user. If an amount of Reserved space is defined, the media synchronization engine determines an amount of space remaining in the file system after allocating the Reserved Space, the Other space, and the amount of file system space expected to be utilized by media files selected by a user. Again, the amount of space remaining represents an amount of space available for the media sync engine to autofill with media files ("Predicted Autofill") (block 808).

Embodiments of the disclosure are not limited to the operations shown in FIG. 8. Additional or different operations may be used in alternative implementations of the disclosure.

Figure 9:
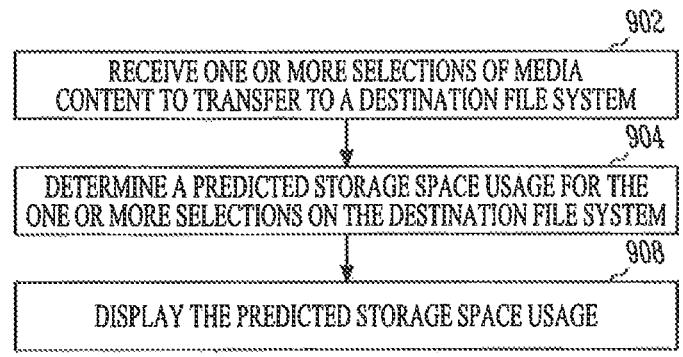
FIG. 9 is a flow chart of a method of managing transfers of files to a destination file system according to an example embodiment.

FIG. 9 is a flow chart of a method of managing transfers of files to a destination file system according to an alternative embodiment. The method may be performed by a media synchronization engine such as media synchronization engine shown in FIG. 2.

As shown in FIG. 9, the media synchronization engine receives one or more selections of media content to transfer to a destination file system (block 902). The media synchronization engine determines a predicted storage space usage for the one or more selections on the destination file system (block 904) and displays the predicted storage space usage (block 906) prior to synchronizing the files.

In an alternative embodiment, the media synchronization engine also displays the storage space usage for files from external file systems and the storage space remaining. In an example embodiment, the display may be in the form of a segmented bar. In still another embodiment, the predicted storage space usage and the storage space remaining are dynamically updated as media content is selected for synchronization.

Embodiments of the disclosure are not limited to the operations shown in FIG. 9. Additional or different operations may be used in alternative implementations of the disclosure.

Figure 10:
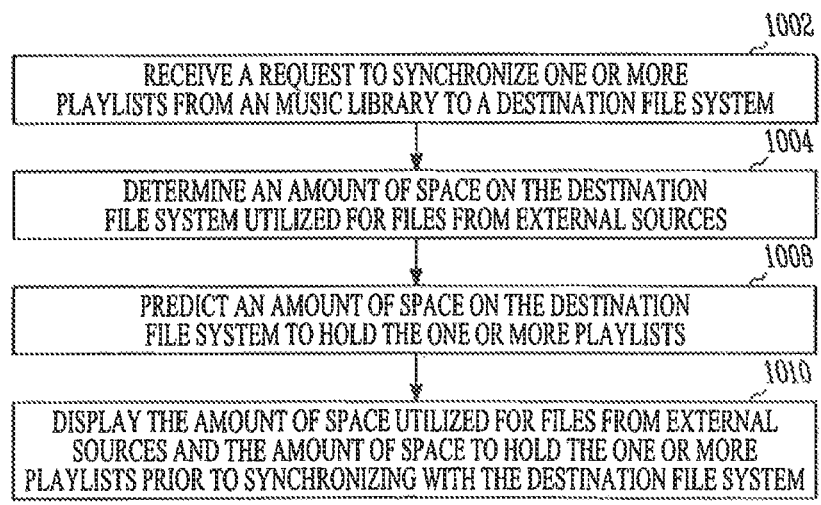
FIG. 10 is a flow chart of a method of synchronizing media content according to an example embodiment.

FIG. 10 is a flow chart of a method of synchronizing media content with a destination file system according to an alternative embodiment. The method may be performed by a media synchronization engine such as media synchronization engine shown in FIG. 2. In some embodiments, the media synchronization engine may run on a desktop computer system, an enterprise server, or a mobile wireless device. In one example, the destination file system is a memory card on a mobile wireless device such as a BlackBerry brand smart phone.

As shown in FIG. 10, a media synchronization engine receives a request to synchronize one or more playlists from a music library to a destination file system (block 1002). The media synchronization engine determines an amount of space on the destination file system utilized for files from external sources (block 1004). The media synchronization engine predicts an amount of space on the destination file system to hold the one or more playlists (block 1006).

The media synchronization engine displays the amount of space utilized for files from external sources and the amount of space to hold the one or more playlists prior to synchronizing with the destination file system (block 1008).

In an alternative embodiment, predicting an amount of space on the destination file system further comprises summing a size for each file in the one or more playlists, a size for one or more folders to be created on the destination file system, and a size for an amount of metadata to be added to t the destination file system. In one example, the size for each file in the one or more playlists comprises the size of the file and a size of metadata to be injected into the file during synchronization. In another example, each one of the files is a music track and the metadata to be injected into the file is album art. In still another embodiment, the music library is an iTunes music library and the one or more folders to be created comprise at least one of folders for artists, folders for albums and folders for compilations.

Embodiments of the disclosure are not limited to the operations shown in FIG. 10. Additional or different operations may be used in alternative implementations of the disclosure.

Example Implementations. Various examples of systems and methods for embodiments of the invention have been described above. In this section provides several example implementations of the various systems and methods.

In various embodiments, a UI for managing media files on a device and pending transfers is provided. The UI may include graphical indicators for status (e.g., on device, on PC, etc) and/or actions (e.g., download, purchase, preview, email, play remotely). Some example UI screens from a device are provided in FIGS. 12-17.

The embodiments shown in FIGS. 1-8 may be implemented as a desktop application to synchronize media content with a mobile wireless communications device. The embodiments shown in FIG. 1-8 may also allow a user to use a mobile wireless communications device to browse and synchronize a library on a PC with a library on the mobile wireless communications device. An example architecture for the embodiments shown in FIGS. 1-10 is shown in FIG. 11.

Figure 11:
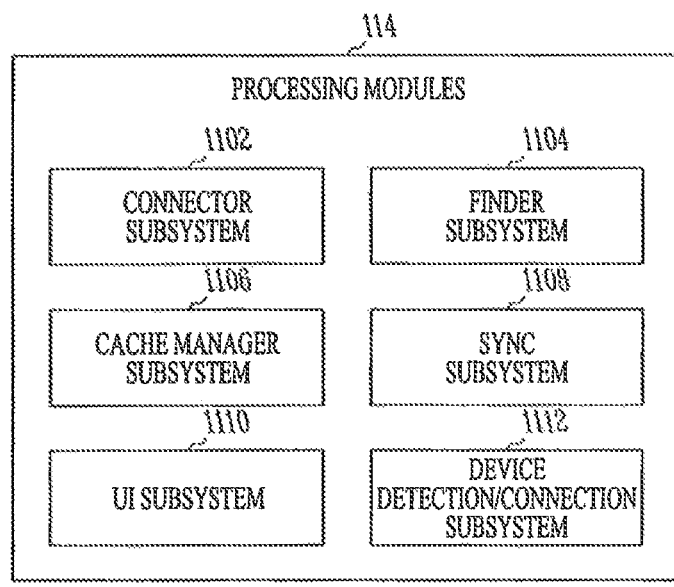
FIG. 11 is a more detailed block diagram of the processing modules shown in FIG. 1 according to an example embodiment.

FIG. 11 is a more detailed block diagram of the processing modules 114 shown in FIG. 1 according to an example embodiment. In the example embodiment shown in FIG. 11, the processing modules 114 for the system for managing media content 110 comprise a connector subsystem 1102, a finder subsystem 1104, a cache manager subsystem 1106, a sync subsystem 1108, a user interface subsystem 1110, and a device detection/connection subsystem 1112.

The connector subsystem 1102 identifies specific sources of media content such as libraries or folders/files. In one embodiment, the connector subsystem 1102 performs a discovery function that finds specific sources. The connector subsystem 1102 may comprise one or more individual connectors. A connector is software and/or hardware that is capable of communicating with one or more sources of media content using the applicable application programming interface (API), protocols, file formats, etc. In one embodiment, each one of the connectors is capable of communicating with a specific type of media content. For example, one of the connectors may be for use with an iTunes library. In this example, when an instance of an iTunes library is discovered, the connector retrieves the collections from that instance of the iTunes library and provides information about the collections to the cache manager subsystem 1106. In another embodiment, some of the connectors may each be capable of communicating with more than one type of media content. In a further embodiment, a single connector is capable of communicating with any type of media content.

In one embodiment, a connector may be a read-only connector, an index connector, or a writable connector. A read-only connector may read a source such as a library, but may not modify the source. An index connector also may not modify a source, but the index connector may more efficiently read the source than the read-only connector. In this embodiment, the index connector may implement an API or an optimized query format for the source. A writable connector may also modify a source such as a library. A connector that modifies a library may perform any action that changes the library, including writing data to the library or deleting data from the library. For example, a connector may be used to add a user assigned rating for a song to an iTunes music library. Other examples of actions that change a library include, but are not limited to, creating a playlist, editing a playlist, deleting a song, etc.

Thus, the connector subsystem 1102 identifies specific sources of media content and retrieves information about the media content. The connector subsystem 1102 may provide the information about the media content to the cache manager subsystem 1106.

The finder subsystem 1104 provides a discovery mechanism for the connectors. In one embodiment, the finder subsystem 1104 identifies what connectors are available to the system for managing media content 110. In another embodiment, the available connectors register with the finder subsystem 1104. If a separate connector is used for each source of media content, the particular connectors that are discovered by or registered with the finder subsystem 1104 will determine what type of media content may be discovered by the system for managing media content 110.

The cache manager subsystem 1106 unifies media content available to a user across multiple sources. The cache manager subsystem 1106 may receive information about media content from the connector subsystem 1102. In one embodiment, the cache manager subsystem 1106 maintains one or more data structures for the media content that is available to transfer to the device. The data structures in the cache manager subsystem 1106 unify information about media content that is stored in independent sources. For example, if the same music track is present in multiple libraries (e.g., in a user's iTunes library and in the user's Windows Media Player library), the cache manager subsystem 1106 may maintain a single data structure that is an aggregation of the tracks from the different libraries. Alternatively, the cache manager subsystem 1106 may maintain a separate data structure for the tracks from each of the different libraries. The cache manager subsystem 1106 may store the data structure(s) using any form of data storage. The data storage may be volatile or non-volatile and may be implemented using any method or technology for storing of information. In addition, in some embodiments, the cache manager subsystem 1106 may maintain one or more data structures for media that is available to transfer from the device to a computer (e.g., a desktop computer, an enterprise server, a laptop computer, and the like). For example, media files such as pictures or videos may be transferred from the device to the computer. In this case the device, is also treated as another source in the system for managing media content 110.

In some embodiments, the cache manager subsystem 1106 may implement connector watchers. A connector watcher monitors one or more sources of media content and determines when the source has changed. For example, if the iTunes xml file changes or if the iTunes library has been updated, the connector watcher that is monitoring the particular source detects the update and updates the appropriate data structure in the cache manager subsystem 1106 with the updated information about the media content.

In one embodiment, the cache manager subsystem 1106 may also determine which of the available connector(s) to use. For example, if media content may be accessed either by using the iTunes software or through the iTunes xml file, the cache manager subsystem 1106 determines whether to use iTunes application connector or the iTunes xml file connector in order to access the iTunes media content. In an alternative embodiment, the finder subsystem 1104 may determine which of the available connector(s) to use.

Thus, the cache manager subsystem 1106 brings together information about media content from multiple media sources that would otherwise have to be accessed directly from each media source and the cache manager subsystem 1106 provides the information to the sync subsystem 1108.

The sync subsystem 1108 allows a device to be synchronized with all or a subset of the available content from different sources. In one embodiment, the sync subsystem 1108 may provide the UI subsystem 1110 with information about media content that is available to transfer to the device (also referred to as "available content") as well as information about media content that is already present on the device. The sync subsystem 1108 may retrieve information about the available content from the data structure(s) maintained by the cache manager subsystem 1106. The information maintained by the cache manager subsystem 1106 represents the content available from multiple sources that a user may select to transfer to a device. The sync subsystem 1108 may also retrieve information about the content that is already present on the device either from the device itself or from a storage location other than on the device. In addition, in some embodiments, the sync subsystem 1108 also allows a computer (e.g., a desktop computer, an enterprise server, a laptop computer, and the like) to be synchronized with all or a subset of the available media content from the device as a source of media content. For example, media files such as pictures or videos may be transferred from the device to the computer.

In some embodiments, the sync subsystem 1108 may also maintain a desired library. The desired library identifies the media content that is to be stored on the device after selections from either the user or the system for managing media content are applied. A desired library may include all of the media content in the user's various sources (the available content) or the desired library may be a subset of the available content. In one embodiment, the desired library functions as a filter for the content to be transferred to the device. Rather than transferring all of the content available from the user's various collections of media content, just the content that is selected for the desired library is transferred to the device. The desired library may be selected by the user through the UI subsystem 1110 or may be automatically selected by the system for managing media content or may be selected through some combination of both. In an alternative embodiment, the desired library may be maintained by the cache manager subsystem 1106 rather than by the sync subsystem 1108. In some embodiments, the content of the desired library persists even when an application program to implement the system for managing media content is not running or when a computer system running such an application program is restarted.

In some embodiments, the sync subsystem 1108 may also identify the actions to create the desired library on the device (e.g., copying songs or playlists, deleting songs or playlists, etc.) and, in some embodiments, the sync subsystem 1108 may manage the actual transfer of media content to create the desire library on the device.

Thus, sync subsystem 1108 provides information about both the available content and the content that is already present on the device to the user interface subsystem 1110 so that a user may view the information. The sync subsystem 1108 may also maintain a desired library and/or determine the actions to synchronize the device with the desired library.

The user interface (UI) subsystem 1110 provides a graphical user interface through which a user may access media content from multiple sources. The UI subsystem 1110 receives from the sync subsystem 1108 aggregated information about media content available from the different sources. The UI subsystem 1110 also receives from the sync subsystem 1108 information about media content that is already available on the device. The UI subsystem 1110 presents this information to the user through a graphical user interface. In one embodiment, the graphical user interface is part of an application program such as a media sync application program running on a computer system other than the device. In another embodiment, the graphical user interface is part of an application program running on the device itself.

The UI subsystem 1110 allows the user to browse the available content as well as the content that is currently stored on the device. The UI subsystem 1110 may display the content so that it may be browsed by individual media files (songs, photos, movies, etc.) or by groups of media files (e.g., playlists, albums, folders, etc.) or as some combination of both.

The UI subsystem 1110 also allows the user to create a desired library (i.e., the media content that the user wishes to have on the device after the media content on the device is updated). In one embodiment, the user may select media content using graphical user interface options for adding a track or playlist to the desired library, removing a track or playlist from the desired library, and so on. In another embodiment, the user may select a graphical user interface option that instructs the system for managing media content 110 to automatically select the media content to be transferred to the device. In some embodiments, the system for managing media content 110 may also automatically select the content to transfer to the device even though the user has not selected such an option. This may occur when the user creates a desired library that requires more space than is available or is allocated for media content on the device. For example, a user may create a desired library with 20 gigabytes of music, but the device only has space for a library with 1 gigabyte of music. In this example, the system for managing media content 110 may automatically select one gigabyte of music from the 20 gigabytes of music in the desired library to transfer to the device.

The UI subsystem 1110 may display a current state of the desired library as the user creates or modifies the desired library. In some embodiments, the UI subsystem 1110 may also display an indication of what will happen if the current state of the desired library is transferred to the device. If the desired library is too large for the space available on the device, the system for managing media content may further limit the content that is transferred to a subset of the desired library. This may occur if the user creates a desired library that requires more space than is available on the device.

In some embodiments, the UI subsystem 1110 may also display information about the device. The UI subsystem 1110 may receive information about the device from the device detection and connection subsystem 1112. For example, the UI subsystem 1110 may display a graphical representation of how much data storage space on the device is currently consumed and how much data storage space the desired library will use on the device. In some embodiments, information about the device capacity may be presented using categories. For example, the categories may include, but are not limited to, "used," "music," and "free," In one embodiment, the categories of data are presented on a memory bar that graphically indicates how much space on the device is "free", how much space on the device is used for "music" or "playlists", and how much space on the device is "used" for other data. In addition, the UI subsystem 1110 may also display an amount of "reserve space" in the file system. For example, the UI subsystem 1110 may present either just the free space that is available to a user, or the free space as well as an amount of reserve space. However, embodiments are not limited to displaying information in categories or presenting the categories graphically as a memory bar.

Thus, the UI subsystem 1110 provides a graphical user interface through which a user is presented a single unified view of media content from multiple sources. The user may use the media content to browse and manage the media content. In addition, in some embodiments, the UI subsystem 1110 may also graphically indicate when a device is connected to the system for managing media content 110. For example, when the device detection and connection subsystem 1112 determines that a device is connected, the UI subsystem 1110 may display an image of a device on the graphical user interface.

The device detection and connection subsystem 1112 identifies when a device is connected or disconnected from the system for managing media content. A device may be connected using a wireless connection or a wired connection such as a High Speed USB (Universal Serial Bus) connection.

When a device is connected to the system, the device detection and connection subsystem 1112 may also obtain information from the device such as information about device characteristics (e.g., screen size, screen resolution, etc.) device capabilities (e.g., file system and supported file formats), files already available on the device, device capacity or available storage space, and so on. In an example embodiment, the information from the device may influence what types of connectors are selected by the connector subsystem 1102. For example, if the device only supports one type of file format, then only the connectors for libraries with files of that particular format may be invoked. As a result, the information maintained in the cache manager subsystem 1106 and provided to the sync subsystem 1108 as available content for the desired library will only be files that are supported by the device. In this sense, the information from the device is used to filter the available content. In one embodiment, this filter may contain supported extensions by the device, and this filter will be applied on the desired library in order to get a subset of media files/playlists that can be played/viewed on the device. The supported extensions filter will vary by device version, or the software version running on the device. A filter may be applied on the content read from the device. For an example, if the device contains media previously synched from more than one computer, a filter may be applied to only read in the data previously synched from the current computer the media app is running from. In addition, in some embodiments, the device detection/connection subsystem 1112 may also enable a user's access to a device by prompting for a password from the user and then providing the password to the device.

The processing modules 114 for the system for managing media content 110 are not limited to the connector subsystem 1102, the finder subsystem 1104, the cache manager subsystem 1106, the sync subsystem 1108, the user interface subsystem 1110, and the device detection/connection subsystem 1112. The subsystems described by reference to FIG. 11 are for illustrative purposes only. Different implementations of the system for managing media content may comprise additional or different subsystems that will allow a user to transfer media content from multiple media sources to a mobile device.

In various embodiments, device configurations and operational methods are provided for a user of a mobile wireless communications device to remotely view and/or manage their music home music libraries directly from their mobile wireless communications device with the ability to synchronize/transfer music through wired connectivity and/or wirelessly and justifies them within their context of use. Such transfer may be realized in a personal computer (PC). Such transfer may be realized in a wireless server in which the user and/or the mobile wireless communications device are registered as being allowed to enter into such transfers. The wireless server may be configured in a personal computer. The mobile wireless communications device may be a handheld device such as a cell phone-type device. The mobile wireless communications device may be a portable computer such as a lap-top computer. Such configurations and operating structures provide a straight-forward user friendly way, both in a user's mobile wireless communications device and in a personal computer of the user, for managing multimedia files, audio files, video files, and/or combinations thereof, belonging to a user or which the user is allowed to access.

In various embodiments, transfer/sync of multimedia files, audio files, video files, and/or combinations thereof between a computer (and associated media managers of the computer) and a mobile wireless communications device may be accomplished using a number of mechanisms. The transfer/sync between the mobile wireless communications device and the wireless server maybe accomplished through a USB connection. The transfer/sync between the mobile wireless communications device and the wireless server maybe accomplished through a Wi-FI communication session. The transfer/sync between the mobile wireless communications device and the wireless server maybe accomplished over wide area network (WAN) such as a wireless network.

In various embodiments, a mobile wireless communications device is configured with hardware, software, and combinations thereof to view offline, from its associated PC or associated wireless server and offline from the Internet, a library or libraries that may include multimedia files, audio files, video files, photos, videos, podcasts, and/or combinations thereof in the mobile wireless communications device. Such libraries may include libraries of iTunes®, Windows Media Player®, other music libraries, video libraries, and other multimedia libraries. The mobile wireless communications device may include executable instructions allowing its user to view, edit, delete, and schedule multimedia, music, video, and/or combinations for sync between the mobile wireless communications device and its associated personal computer or wireless server. All changes/requests/transfers may occur automatically upon establishment of one of more of USB, Wi-Fi, or WAN connections to the associated personal computer or wireless server. In various embodiments, the personal computer may be configured with appropriate instrumentalities to operate as a wireless server. The hardware and software of the mobile wireless communications device may include a multimedia sync application having a remote management tool to manage a user's libraries of the user's PC, such as but not limited to music from the user's iTunes® or Windows Media Player® (WMP), directly from the mobile wireless communications device. Various embodiments provide functions to manage, play, and sync multimedia presentations, video, and/or music that bridge the gap between PC sync and remote access to realize media management from a handheld wireless device rather than limiting such management to a desktop.

In various embodiments, mobile wireless communications devices are configured to allow offline access to a user's entire PC music library and to allow a 2-way sync, including wireless, between the mobile wireless communications device and the target media manager on a user's PC. For example, a mobile wireless communications device may be configured to schedule downloads and syncs of media avoiding limitations associated with streaming the media content directly to the handset. The mobile wireless communications device may be configured with a remote management application and a wireless sync application, where each has access (an optimized copy) of the user's media library directly from the mobile wireless communications device. Access to this library may not require a network connection to an associated PC or a server on the Internet. The library may be arranged as a multimedia library, a music library, a video library, or a combination thereof. In an embodiment, an optimized version of a user's music library may be contained on the user's mobile wireless communications device allowing for offline viewing and management such that only the optimized music library file (i.e. an "index") is present on the user's mobile wireless communications device, not the actual songs themselves. Any edits or requests for download/sync will sync with the user's associated PC upon connection via USB, WAN, or WLAN (wireless local area network). New media content, such as new music content, that have been requested for download may be contained in a download "manager"/queue and may be sent to the user's device upon the next USB or Wi-Fi connection. The download may be sent on the next connection in a wireless network to which the computer is coupled.

In an embodiment, should the user choose, they can force transfer/download of any item in the pending download queue over a cellular network.

In various embodiments, a mobile wireless communications device may be configured with hardware and software that provide: simple ease of use for the user, integration between the mobile wireless communications device and a desktop manager and/or a media sync application of a wireless server configured in a personal computer, support of USB sync, WLAN sync, WAN sync, or sync using combinations thereof between a user's PC and their mobile wireless communications device, integration with different media players such as but not limited to iTunes® and Windows Media Player®, ability for a user to view their media libraries directly from the mobile wireless communications device without a network connection for viewing via a small/optimized copy of the libraries, ability to view library content by album, artist, genre, playlists, ability to add music, such as but not limited to individual songs, albums, artists, playlists to a download manager/queue, ability to transfer/synchronize media in the download queue with the user's mobile wireless communications device upon next USB or Wi-Fi connection to their associated PC or associated PCs, and a 2-way sync with media libraries on the users home PC. A 2-way allows for activity on a mobile wireless communications device to be conducted in a manner similar to the activity of the PC. For example, if a user deletes music or creates/edits a playlist from their mobile wireless communications device, the data can be transmitted wired and/or wirelessly, and these changes reflected in the media libraries on the user's associated PC, which may include iTunes® and WMP among others. Further, if a user deletes music or creates/edits a playlist from their associated PC via one or more libraries on the PC, the data can be transmitted wired and/or wirelessly, and these changes reflected on the mobile wireless communications device. For example, new media content that have been requested for download may be contained in a download manager/queue and may be sent to the user's mobile wireless communications device upon the next USB, Wi-Fi, or wireless network connection. Should the user choose they can force transfer/download any item in the pending download queue over a cellular network.

In various embodiments, a mobile wireless communications device may be configured to operate with any operating system that may be used in a cellular device. The mobile wireless communications device may be configured with access to media functions with external controls to virtually provide for unlimited storage for a user's media, with independence from the PC desktop to manage all user media needs directly from their portable wireless device, with an open marketplace to discover/acquire music directly from a portable wireless device, with automatic updates/sync of activity conducted on a portable wireless device, with ability to play music on a portable wireless device with other devices such as a car, a home stereo, or other such device, with remote access from the user's mobile wireless communications device to access to their PC library of music and other media.

Figure 12:
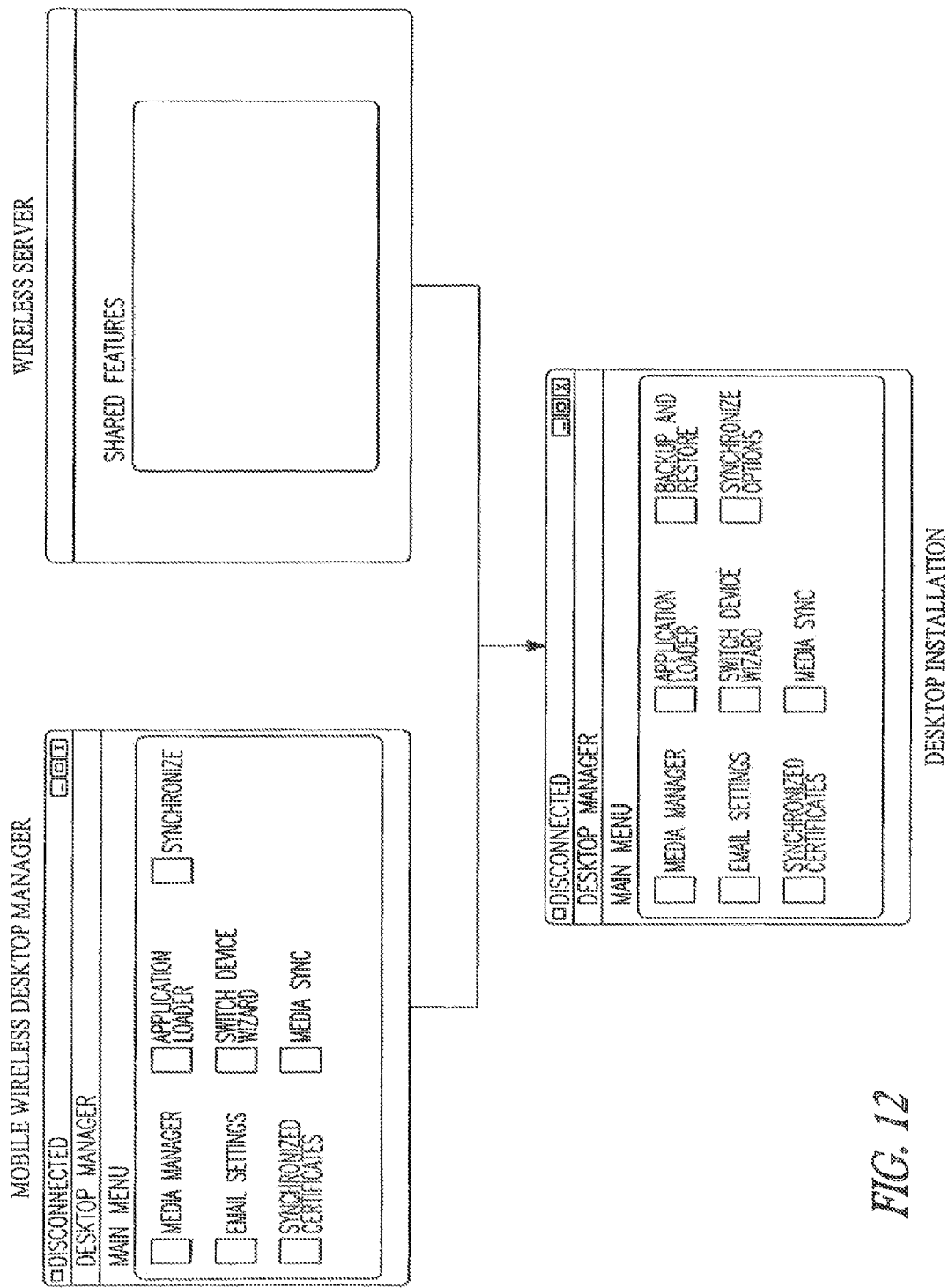
FIG. 12 illustrates an embodiment of a media wireless sync feature installed on a PC with installation of an associated wireless server, according to various embodiments.

In various embodiments, a media wireless sync feature may be installed on a PC with installation of an associated wireless server, as illustrated in FIG. 12. The installation may be realized using a USB connection. The installation may be realized initiated using a USB connection and completed over an Internet connection. The installation may be realized using a Wi-Fi connection. The installation may be realized initiated using a Wi-Fi connection and completed over an Internet connection. After completion of the installation of the media wireless sync feature, a message indicating that the media wireless features/functionality are enabled may be provided to the user via the mobile wireless communications device, the PC, and/or both.

The media sync application of the mobile wireless communications device may support multiple mobile wireless communications device/users within a home, based on a registration, for example based on a personal identification (PIN). The libraries and the sync to these libraries may be partitioned among the various users of the PC. For example, one person may choose to sync music with one library such as iTunes®, another person may choose to sync with another library such as Windows Media Player®, and a third person may choose to sync with both libraries. The user interface of the wireless server on the PC may allow for dynamic selection of supported media managers as well as remember the last media manager (store the identity of the last media manager or last several media managers) to which a specific mobile wireless communications device synchronized with it and to remember preferences associated with the synchronization. In an embodiment, a file may be specified not to be transferred to the mobile wireless communications device, unless the file is supported by the mobile wireless communications device. Users may be made aware of this through a graphic user interface, if a specific file or file type has been identified as not being selectable for sync. For example, music files that are not to be synced may be shown using an icon or other indicator of a lock condition, when a user is viewing their music library from the mobile wireless communications device.

Figure 13:
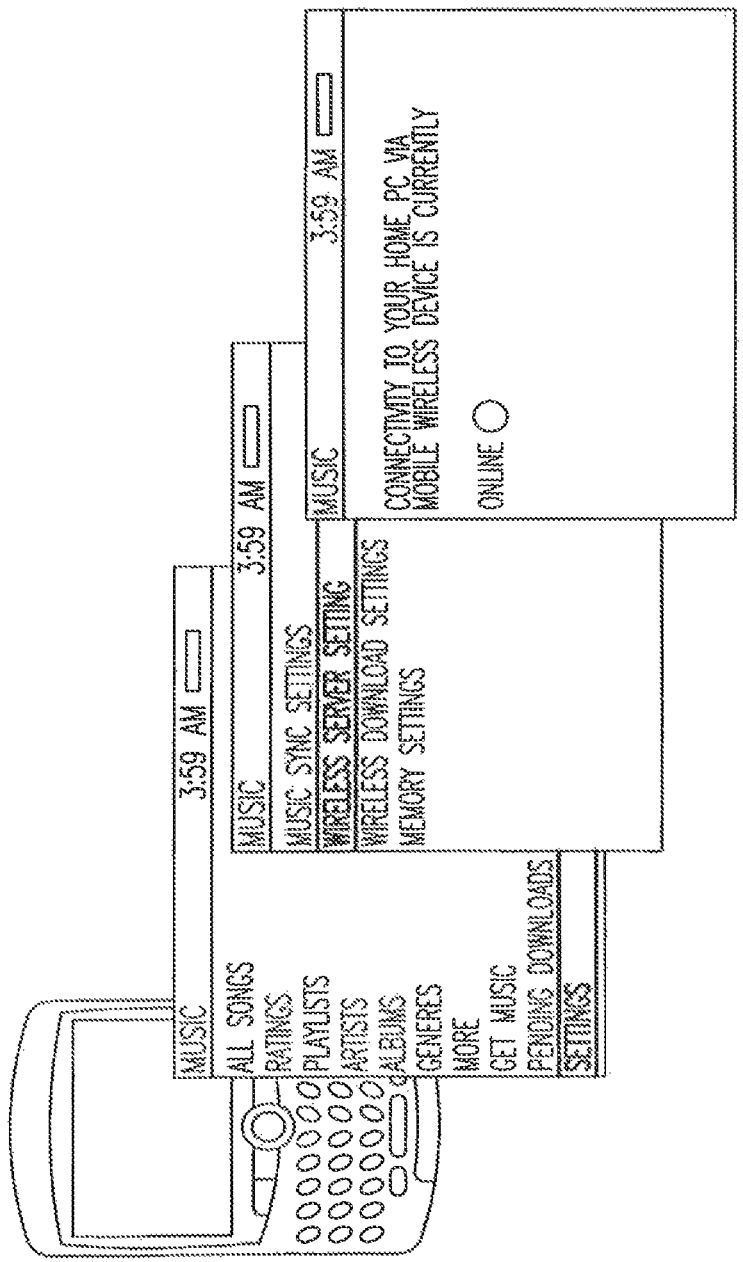
FIG. 13 illustrates an embodiment of an example of a user interface showing connectivity, according to various embodiments.

From the user's mobile wireless communications device, the user may observe the status of connectivity to their home PC via a wireless server on the home PC. This view can enable the user to determine if they are able to sync and/or download content via Wi-Fi, WAN, or other connection. FIG. 13 illustrates a non-limiting example of a user interface showing connectivity. A media sync application provides a user with an ability to view (offline) either a media library directly from a mobile wireless communications device allowing them to view, edit, delete, and schedule music for sync. All changes/requests/music transfers can occur upon a USB, Wi-Fi, or WAN connection to their home PC. With a wireless server on a home PC offline, an error message may be generated to indicate the status of the wireless server when attempting to force a transfer or download via a network connection.

An optimized version of a user's music library contained by a library in the user's PC may be contained on the user's device allowing for offline viewing and management. The optimized media library file may be arranged as an index on the user's mobile wireless communications device. Media filed in the mobile wireless communications device may be stored in the mobile wireless communications device separate from the optimized media library file. During setup (and at any time) of the desktop media sync application, users can select which media manager or managers that they would like configured for remote management and wireless sync.

From a user's mobile wireless communications device, a user may able to enter the total music library or individual libraries and sort by all songs (name), artist, album, and music genre. The user may also be able to view by all playlists, standard and smart (automatic) as well as those contained in folders. When viewing a playlist from the mobile wireless communications device, users also may able to view/sort by all songs (name), artist, album, and music genre. Viewing and sorting is not limited to music but may be applied to photos, video, and other multimedia presentations. With the optimized music library file as an index present on the users mobile wireless communications device, and not all the actual songs themselves contained within the library, the optimized library may be sufficiently small allowing the library to be stored on the internal memory of the user's mobile wireless communications device. In various embodiments, swapping memory cards does not disable remote management.

In various embodiments, the optimized media library file on the user's mobile wireless communications device may be refreshed and kept in sync with the media libraries on the user's PC. This sync may provide automatic updating so that the most up to date view of the media library accessible to the PC is available to the user from their mobile wireless communications device. An updated/synchronized copy of the media library may be transferred to the user's mobile wireless communications device upon the next USB/WLAN/WAN connection to the desktop music sync application.

Figure 14:
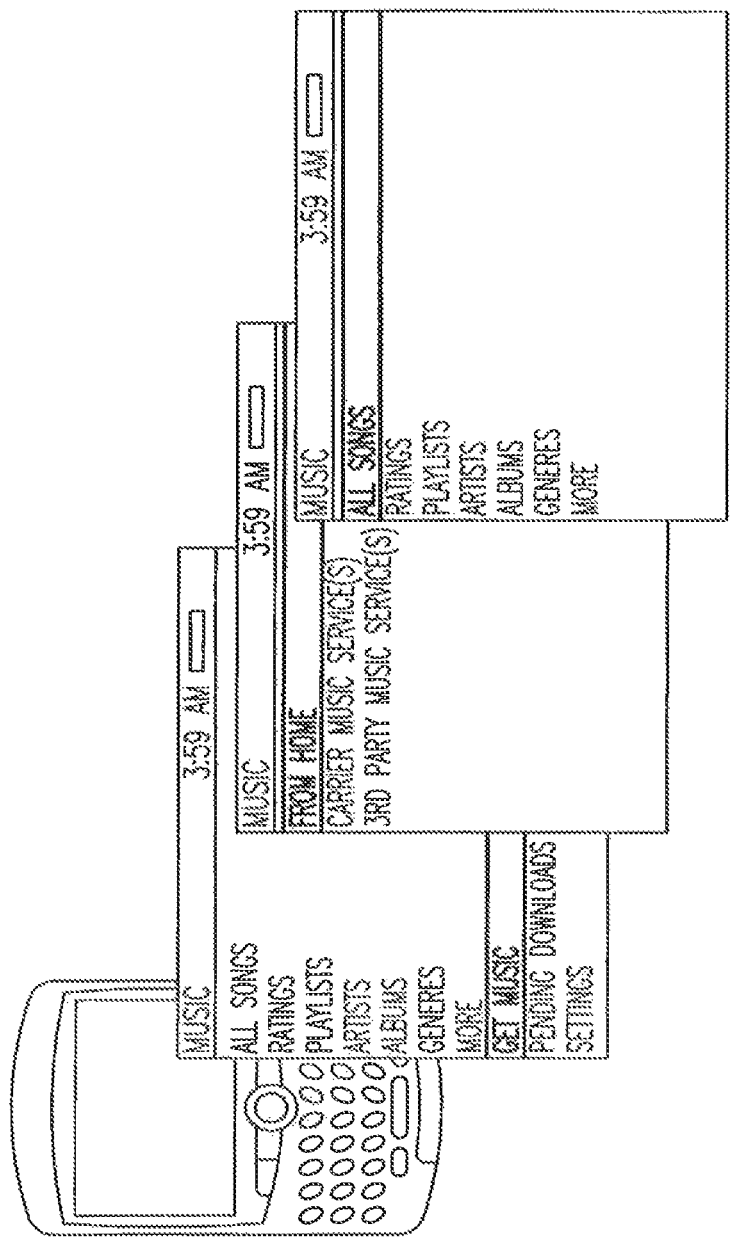
FIG. 14 illustrates an embodiment of an example of a user interface when accessing a home music library, according to various embodiments.

FIG. 14 shows an example of a user interface when accessing a home music library. The user interface is not limited to a home music library but may be libraries of other multimedia presentations. As shown, the user interface provides access and management of a user's music library, for example a user's iTunes® or WMP music library, that is easy to use, intuitive, and be structured in such a way that it allows users to easily view their music libraries directly from the music application on the mobile wireless communications device.

Figure 15:
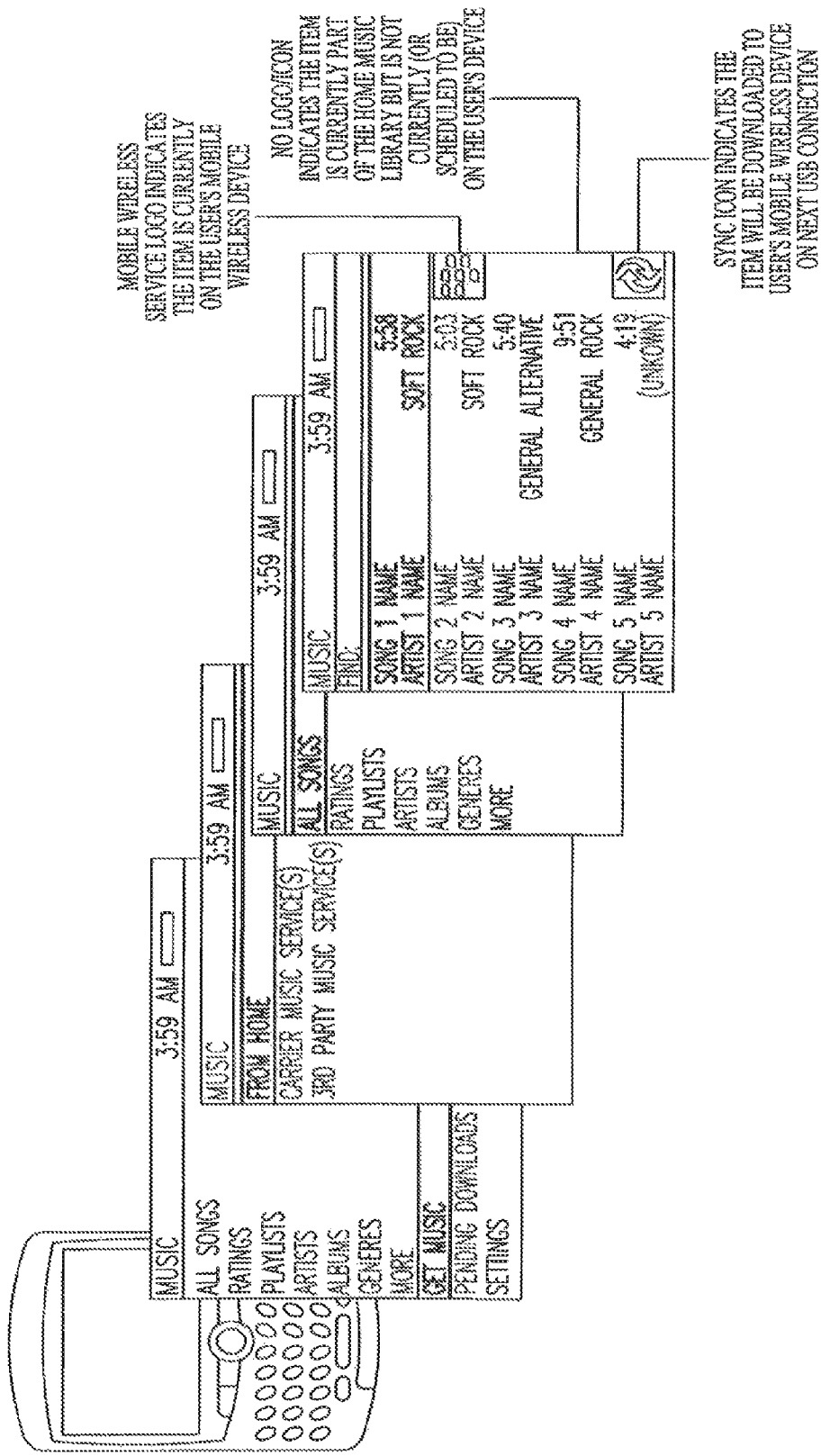
FIG. 15 illustrates an embodiment of an example of viewing a media library, according to various embodiments.

In viewing their home media library from the mobile wireless communications device, the view may be provided in a manner that it similar to how the media library is displayed on the local PC. FIG. 15 illustrates an example of viewing a media library that is easy to use, intuitive, and structured in such a way that it allows users to easily view their media library directly from the media application on the mobile wireless communications device. The view may also provide a view of media that is on their mobile wireless communications device vs. what is not on the mobile wireless communications device with respect to what is in the home libraries. The view may also provide a view of media that has been added to the media download manager as pending downloads that will be transferred/synchronized with their device upon the next USB sync, WLAN sync, or WAN sync with the mobile wireless communications device. The user may also be provided with an indication of the total amount of memory corresponding to media on their mobile wireless communications device including free/available memory, media at an associated PC such as a home PC, and media in the download manager pending download. The media may be further presented in various categories such as music, video, and other multimedia presentations.

In various embodiments, when a user views their home music library, it may be similar to how they view the media local to their mobile wireless communications device to edit the home media library. Users may be able to edit their home music library from a remote management application with a wireless sync feature allowing them to delete media, such as music, on a selected basis and/or edit playlists. For example, the selected basis allows for editing music based on individual songs, albums, artists, genres, or playlists. For example, using edit playlists as a basis allows for adding and/or removing songs contained in one or more playlists. These edits may sync with the users PC and the corresponding media manger library or libraries upon the next USB/WLAN/WAN connection to the desktop media sync application on their home PC. Delete actions may be accompanied by a prompt inquiring as to whether or not the user would like to delete the item from the specified library on the mobile wireless communications device only (keep file on computer) or from the specified library on the associated computer as well.

Figure 16:
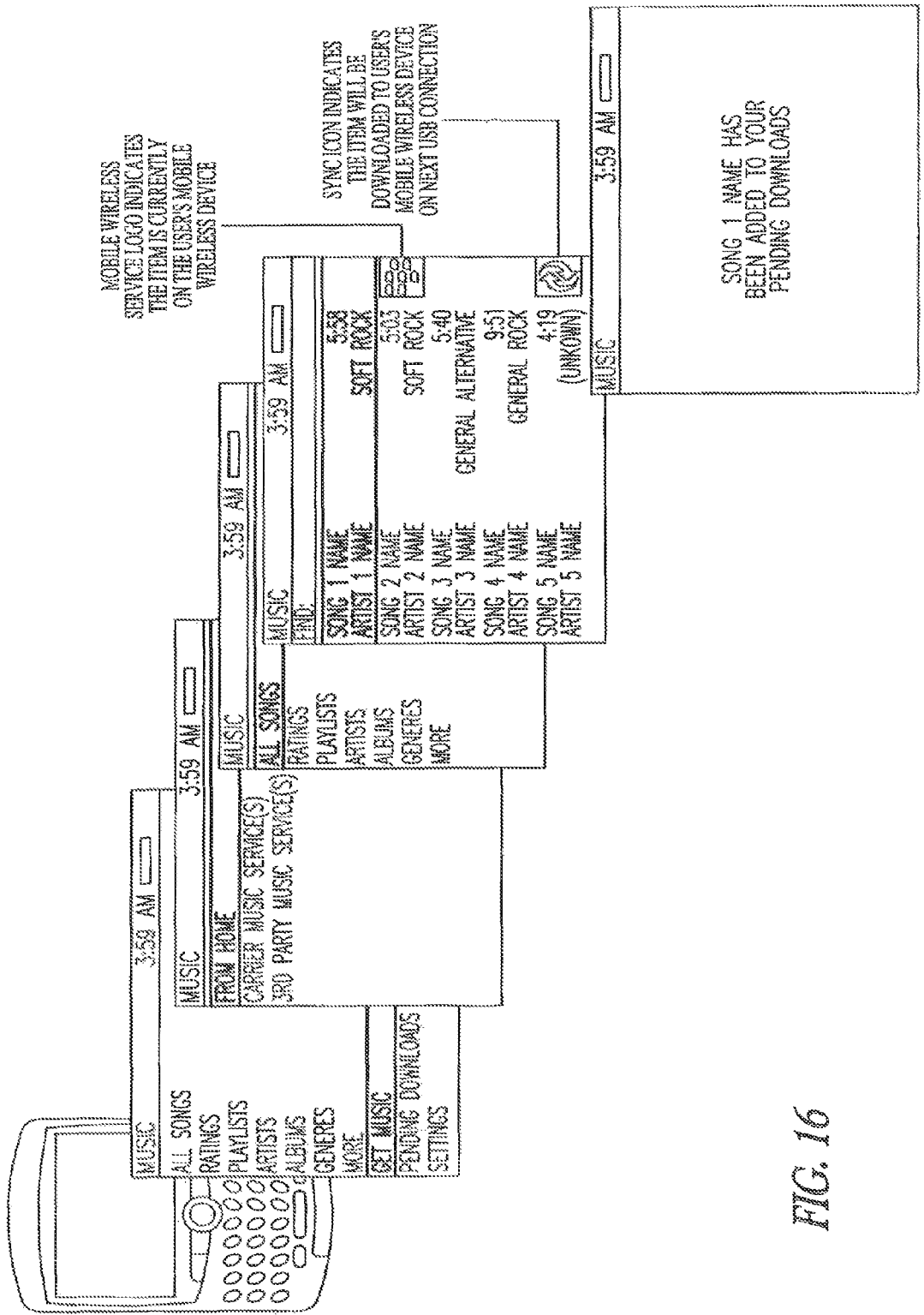
FIG. 16 shows an embodiment of an example of a user interface with respect to adding music to the download manager, according to various embodiments.

FIG. 16 shows an example of a user interface with respect to adding music to the download manager. While viewing a user's home music library, the user may add the following to a download music manager as pending downloads: individual songs, individual albums, individual artists (all songs by an individual artist), individual genres (all songs contained in a single genre), entire playlists, and other categories for arranging music. Additions are not limited to music, but apply to other multimedia presentations. As an example, this addition feature can be shown as a menu item called "sync with mobile wireless communications device" or "add to downloads" when any of the above categories is highlighted. This may be similar to how adding items local to a mobile wireless communications device is handled with respect to playlists local to the mobile wireless communications device. Users may be able to view all items that are currently "pending sync/download." A remote media access implementation may notify a user if they are attempting to schedule/sync content whose total is larger than the device's available/free memory (external plus internal). The user may be notified/prompted on their device of the total content they are attempting to sync (i.e. what is in the media download manager or "pending downloads" queue) and the available space on the mobile wireless communications device and be instructed to remove content from the sync list or device.

Figure 17:
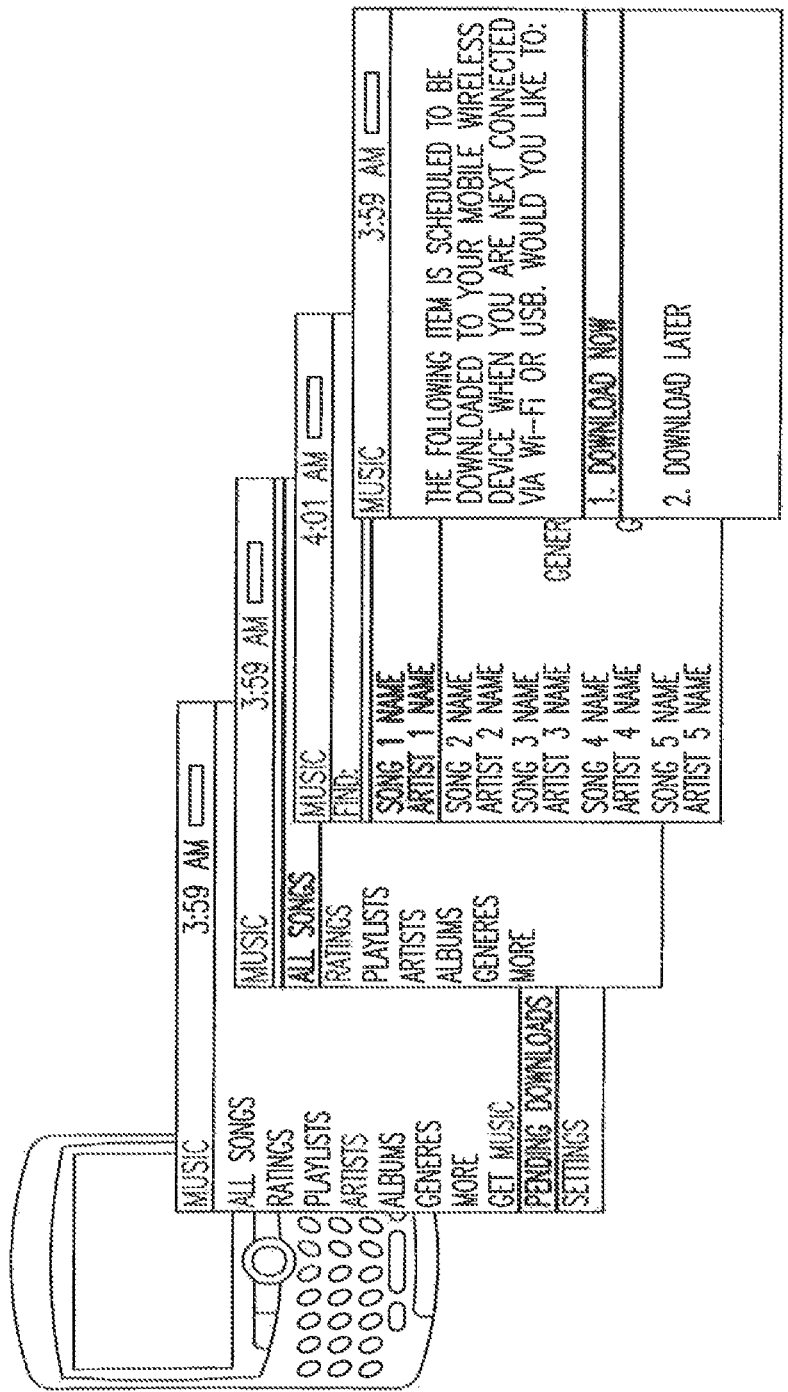
FIG. 17 shows an embodiment of an example of a user interface for viewing a download manager, according to various embodiments.

FIG. 17 shows an example of a user interface for viewing a download manager. This view provides users with the ability to view the media download manager for pending downloads directly from the media home screen of the mobile wireless communications device media player. For example, music that has been requested for download (added to the pending downloads/queue) can be delivered to the mobile wireless communications device upon the next USB, Wi-Fi, or WAN connection. Viewing the items in the pending downloads list may be similar to viewing music on a users mobile wireless communications device and can be sortable (with totals next to each in brackets) by all songs, album, artist, genre, playlists, and other categories.

A user may be provided with a view that indicates in a straight forward manner the total amount of memory corresponding to individual items in the download manager and to total items in the download manager. The following options may be available to the user when viewing the contents of the download manager: (1) delete (i.e. remove items from the download manager), which may include an item no longer being requested for transfer/sync with the device, and (2) download now, which allows for manual force transfer of media via a WAN. Users may be prompted that this may result in cellular data charges as per their existing mobile wireless communications device data plan. Other options may be provided.

Figure 18:
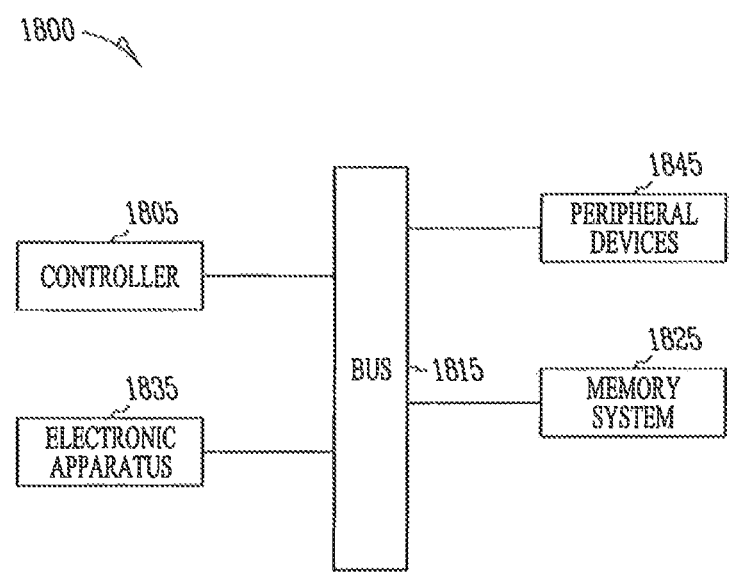
FIG. 18 depicts a diagram of an embodiment of a system having a controller and a memory system, according to various embodiments.

FIG. 18 depicts a diagram of an embodiment of a system 1800 having a controller 1805 and a memory system 1825. System 1800 also includes electronic apparatus 1835 and a bus 1815, where bus 1815 provides electrical conductivity among the components of system 1800. In an embodiment, bus 1815 includes an address bus, a data bus, and a control bus, each independently configured. In an alternative embodiment, bus 1815 uses common conductive lines for providing one or more of address, data, or control, the use of which is regulated by controller 1805. Bus 1815 may be realized as multiple busses. In an embodiment, electronic apparatus 1835 is additional memory system configured in a manner similar to memory system 1825. In an embodiment, additional peripheral device or devices 1845 are coupled to bus 1815. In an embodiment, peripheral devices 1845 include displays, additional storage memory system, and/or other control devices that may operate in conjunction with controller 1805 and/or memory system 1825. In an embodiment, controller 1805 is a processor.

Controller 1805 and memory system 1825 can be arranged to manage media content and associated information on system 1800. In an embodiment, system 1800 is arranged as a PC. The PC may include instrumentality distributed throughout the PC to operate as a wireless server. System 1800 arranged as a PC can operate according to any of the various embodiments discussed herein to manage media content and associated information within the PC and/or in conjunction with one or more mobile devices such as mobile wireless communications devices.

In an embodiment, system 1800 is arranged as a mobile device. The mobile device may be a mobile wireless communications device. System 1800 arranged as a mobile device can operate according to any of the various embodiments discussed herein to manage media content and associated information within the mobile device, and/or in conjunction with a PC or other apparatus having software and/or hardware to manage media content.

Various embodiments or combination of embodiments for apparatus and methods for a system, such as a PC, to manage media content, as described herein, can be realized in hardware implementations, software implementations, and combinations of hardware and software implementations. These implementations may include a machine-readable medium having machine-executable instructions, such as a computer-readable medium having computer-executable instructions, for operating the system in a relationship with one or more mobile devices such that media content and associated information is managed between the system and the mobile device. The communications of the system with a mobile wireless communications device can be conducted on a secured basis. The machine-readable medium is not limited to any one type of medium.

Various embodiments or combination of embodiments for apparatus and methods for a mobile device, such as a mobile wireless communications device, as described herein, can be realized in hardware implementations, software implementations, and combinations of hardware and software implementations. These implementations may include a machine-readable medium having machine-executable instructions, such as a computer-readable medium having computer-executable instructions, for operating the mobile device to manage its media content and associated information within the mobile device, in conjunction with a system, such as a PC, and/or with respect to other mobile devices. The communications between a mobile wireless communications device and the system can be conducted on a secured basis. The machine-readable medium is not limited to any one type of medium.

Although specific embodiments have been illustrated and described herein, it will be appreciated by those of ordinary skill in the art that any arrangement that is calculated to achieve the same purpose may be substituted for the specific embodiments shown. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A mobile device comprising:
a display;
a processor;
a storage device for storing media content;
wherein the processor is configured to execute instructions to perform operations comprising:
retrieving updated metadata of media content stored in a server;
outputting to the display a representation of the media content stored in the storage device and the media content stored in the server;
receiving a selection of an action associated with the media content stored in the server when the mobile device is not connected to the server, wherein the action, after the selection of the action, remains pending until the mobile device is connected to the server;
after the selection of the action and in response to a determination that the mobile device is not connected to the server, presenting a notification indicating that the pending action is scheduled to be executed once the mobile device is connected to the server through a Wi-Fi connection, wherein the notification also includes a graphical element representing an option to execute the pending action by connecting to the server through a cellular connection; and
in response to receiving a selection of the graphical element, connecting to the server through the cellular connection and enabling execution of the pending action, wherein the pending action includes one of deleting a media file from the server or downloading a media file from the server.

2. The mobile device of claim 1, wherein the processor is further configured to use the retrieved metadata to output, when the mobile device is not connected to the server, the representation of the media content.

3. The mobile device of claim 1, wherein the media content is music tracks and the metadata includes album, artist, and size.

4. The mobile device of claim 1, wherein the pending action, selected when the mobile device is not connected to the server, occur automatically upon establishment of the Wi-Fi connection to the server.

5. The mobile device of claim 1, wherein the pending action further includes synchronizing at least one playlist from a music library at the server of the mobile device.

6. The mobile device of claim 1, wherein the pending action further includes synchronizing at least one playlist from a music library at the mobile device of the server.

7. The mobile device of claim 1, wherein prior to executing the pending action of downloading the media file from the server, the processor is further configured to determine if the storage device has a sufficient amount of space required to store the media file.

8. The mobile device of claim 1, wherein prior to executing the pending action of downloading the media file from the server, the processor is further configured to determine if the mobile device supports a format of the media file.

9. The mobile device of claim 1, wherein the representation includes at least one identifier for distinguishing between media content stored in the server and media content stored in the storage device.

10. The mobile device of claim 1, wherein the representation includes at least one identifier for identifying media files that are not selectable for synchronization because the mobile device does not support a format of the media files.

11. The mobile device of claim 1, wherein the representation includes a graphical indicator of an amount of space utilized for media files from the storage device and an amount of space required to hold the media file to be downloaded.

12. The mobile device of claim 1, wherein the processor is further configured to execute instructions to perform operations comprising:
   detecting a lack of space on the storage device to enable the execution of the pending action; and
   presenting an option for reducing an amount of reserve space in response to the detection of the lack of space.

13. A method for managing media content stored in a server using a mobile device, the method comprising:
   retrieving updated metadata of media content stored in the server;
   using the retrieved metadata to output, when the mobile device is not connected to the server, a representation of media content stored in the mobile device and the media content stored in the server;
   receiving a selection of an action associated with the media content stored in the server when the mobile device is not connected to the server, wherein the action, after the selection of the action, remains pending until the mobile device is connected to the server;
   after the selection of the action and in response to a determination that the mobile device is not connected to the server, presenting a notification indicating that the pending action is scheduled to be executed once the mobile device is connected to the server through a Wi-Fi connection, wherein the notification also includes a graphical element representing an option to execute the pending action by connecting to the server through a cellular connection; and
   in response to receiving a selection of the graphical element, connecting to the server through the cellular connection and enabling execution of the pending action, wherein the pending action includes one of deleting a media file from the server or downloading a media file from the server.

14. The method of claim 13, wherein the media content is music tracks and the metadata retrieved from the server includes album, artist, and size.

15. The method of claim 13, wherein the pending action, selected when the mobile device is not connected to the server, occur automatically upon establishment of the Wi-Fi connection to the server.

16. The method of claim 13, wherein prior to executing the pending action of downloading the media file from the server, the method further comprising:
   determining if a storage device associated with the mobile device has a sufficient amount of space required to store the media file.

17. The method of claim 13, wherein prior to executing the pending action of downloading the media file from the server, the method further comprising:
   determining if the mobile device supports a format of the media file.

18. A server, comprising:
   a memory for storing media content;
   a processor configured to:
      provide a mobile device updated metadata of media content stored in the server, such that the mobile device can output a representation of the media content stored on the server when not connected to the server;
      in response to a user selection of executing a pending action associated with the media content stored in the server through a cellular connection, execute the pending action through the cellular connection; and
      in response to an absence of the user selection and a determination that the mobile device is connected to the server through a Wi-Fi connection, execute the pending action through the Wi-Fi connection,
      wherein the pending action includes at least one of the following: deleting a media file from the memory and transferring a media file from the server.

19. A non-transitory computer readable medium having computer executable instructions which when executed by a processor causes a mobile device to perform operations comprising:
   retrieving updated metadata of media content stored in a server;
   using the retrieved metadata to output, when the mobile device is not connected to the server, a representation of media content stored in the mobile device and the media content stored in the server;
   receiving a selection of an action associated with the media content stored in the server when the mobile device is not connected to the server, wherein the action, after the selection of the action, remains pending until the mobile device is connected to the server;
   after the selection of the action and in response to a determination that the mobile device is not connected to the server, presenting a notification indicating that the pending action is scheduled to be executed once the mobile device is connected to the server through a Wi-Fi connection, wherein the notification also includes a graphical element representing an option to execute the pending action by connecting to the server through a cellular connection; and
   in response to receiving a selection of the graphical element, connecting to the server through the cellular connection and enabling execution of the pending action, wherein the pending action includes one of deleting a media file from the server or downloading a media file from the server.

20. The non-transitory computer readable medium of claim 19, wherein the media content is music tracks and the metadata retrieved from the server includes album, artist, and size.

21. The non-transitory computer readable medium of claim 19, wherein the pending action, selected when the mobile device is not connected to the server, occur automatically upon establishment of the Wi-Fi connection to the server.

22. The non-transitory computer readable medium of claim 19, further comprising computer executable instructions which when executed by a processor causes the mobile device to determine if a storage device associated with the mobile device has a sufficient amount of space required to store the media file, prior to executing the pending action of downloading the media file from the server.

23. The non-transitory computer readable medium of claim 19, further comprising computer executable instructions which when executed by a processor causes the mobile device to determine if the mobile device supports a format of the media file, prior to executing the pending action of downloading the media file from the server.

\* \* \* \* \*